United States Patent
Scavo et al.

(10) Patent No.: US 9,641,498 B2
(45) Date of Patent: May 2, 2017

(54) SINGLE SIGN-ON PROCESSING FOR ASSOCIATED MOBILE APPLICATIONS

(71) Applicant: FISERV, INC., Brookfield, WI (US)

(72) Inventors: David Francis Scavo, Johns Creek, GA (US); Barbara Wilson Whiteside, Snellville, GA (US)

(73) Assignee: FISERV, INC., Brookfield, WI (US)

( * ) Notice: Subject to any disclaimer, the term of this patent is extended or adjusted under 35 U.S.C. 154(b) by 242 days.

(21) Appl. No.: 13/788,420

(22) Filed: Mar. 7, 2013

(65) Prior Publication Data

US 2014/0259134 A1    Sep. 11, 2014

(51) Int. Cl.
*H04L 29/06* (2006.01)
*H04L 29/08* (2006.01)
*H04W 4/00* (2009.01)

(52) U.S. Cl.
CPC .......... *H04L 63/08* (2013.01); *H04L 63/0815* (2013.01); *H04L 67/141* (2013.01); *H04W 4/00* (2013.01)

(58) Field of Classification Search
CPC ................................. G06F 9/543; H04L 63/08
USPC ..................................... 726/7, 229, 206, 222
See application file for complete search history.

(56) References Cited

U.S. PATENT DOCUMENTS

| | | | | |
|---|---|---|---|---|
| 5,642,515 A * | 6/1997 | Jones et al. | | 710/220 |
| 6,041,357 A | 3/2000 | Kunzelman et al. | | |
| 6,243,816 B1 * | 6/2001 | Fang | | G06F 21/41 707/999.009 |
| 6,609,198 B1 * | 8/2003 | Wood | | G06F 21/31 713/155 |
| 6,615,258 B1 * | 9/2003 | Barry et al. | | 709/223 |
| 7,013,326 B1 * | 3/2006 | Suzuki et al. | | 709/204 |
| 7,017,049 B2 | 3/2006 | Hand et al. | | |
| 7,275,259 B2 * | 9/2007 | Jamieson | | G06F 21/41 726/10 |
| 7,353,383 B2 * | 4/2008 | Skingle | | H04L 9/3268 713/156 |
| 7,526,560 B1 * | 4/2009 | Samar | | 709/228 |
| 7,574,511 B2 * | 8/2009 | Pujol et al. | | 709/229 |

(Continued)

FOREIGN PATENT DOCUMENTS

WO    2009143322    11/2009
WO    WO 2015042547 A1 *    3/2015    ......... H04L 63/0838

OTHER PUBLICATIONS

Theimer et al., "Operating System Issues for PDAs", 1993.*

(Continued)

*Primary Examiner* — O. C. Vostal
(74) *Attorney, Agent, or Firm* — Alston & Bird LLP

(57) ABSTRACT

Systems, methods and computer-readable media are disclosed for performing single sign-on processing between associated mobile applications. The single sign-on processing may include processing to generate an interaction session between a user and a back-end server associated with a mobile application based at least in part on one or more existing interaction sessions between the user and one or more back-end servers associated with one or more other mobile applications. In order to establish an interaction session with an associated back-end server, a mobile application may leverage existing interaction sessions that have already been established in connection with the launching of other associated mobile applications.

30 Claims, 20 Drawing Sheets

(56) References Cited

U.S. PATENT DOCUMENTS

| | | | |
|---|---|---|---|
| 7,627,658 B2* | 12/2009 | Levett et al. | 709/223 |
| 7,647,430 B2* | 1/2010 | Ng | H04L 12/2823 709/218 |
| 7,765,261 B2 | 7/2010 | Kropivny | |
| 7,870,201 B2 | 1/2011 | Madams et al. | |
| 7,870,202 B2 | 1/2011 | Madams et al. | |
| 7,877,459 B2* | 1/2011 | Tock et al. | 709/217 |
| 7,881,439 B1* | 2/2011 | Cohn et al. | 379/9.03 |
| 7,890,643 B2 | 2/2011 | Justus et al. | |
| 8,005,816 B2* | 8/2011 | Krishnaprasad et al. | 707/709 |
| 8,103,779 B2* | 1/2012 | Belkin et al. | 709/227 |
| 8,156,441 B1* | 4/2012 | Bihari et al. | 715/748 |
| 8,214,394 B2* | 7/2012 | Krishnaprasad et al. | 707/781 |
| 8,327,427 B2* | 12/2012 | Soukup | H04L 63/0815 709/217 |
| 8,341,290 B2 | 12/2012 | Berg | |
| 8,443,429 B1* | 5/2013 | Johnson, Sr. | H04L 67/306 726/1 |
| 8,533,811 B2* | 9/2013 | Bruno | H04M 1/66 713/175 |
| 8,621,572 B2 | 12/2013 | Wang et al. | |
| 8,739,252 B2* | 5/2014 | Kuang | H04L 63/06 380/44 |
| 8,776,209 B1* | 7/2014 | Kumar | H04L 63/0272 380/270 |
| 8,832,787 B1* | 9/2014 | Sanin | G06F 21/41 726/2 |
| 8,836,981 B2 | 9/2014 | Takahashi | |
| 8,843,997 B1* | 9/2014 | Hare | 726/3 |
| 9,264,420 B2* | 2/2016 | Chickering | G06F 21/00 |
| 9,483,627 B1* | 11/2016 | Ferg | G06F 21/31 |
| 9,547,415 B2* | 1/2017 | Lazzaro | G06F 3/0482 |
| 9,571,476 B1* | 2/2017 | Silhavy | H04L 63/08 |
| 2002/0138728 A1* | 9/2002 | Parfenov et al. | 713/170 |
| 2002/0194314 A1* | 12/2002 | Kouznetsov et al. | 709/220 |
| 2003/0018887 A1* | 1/2003 | Fishman et al. | 713/151 |
| 2003/0154403 A1* | 8/2003 | Keinsley et al. | 713/201 |
| 2003/0159072 A1* | 8/2003 | Bellinger | H04L 63/0272 726/8 |
| 2004/0003081 A1* | 1/2004 | Justus | H04L 63/0815 709/225 |
| 2004/0030932 A1* | 2/2004 | Juels et al. | 713/202 |
| 2004/0123144 A1* | 6/2004 | Chan et al. | 713/201 |
| 2004/0128392 A1 | 7/2004 | Blakley et al. | |
| 2004/0148375 A1* | 7/2004 | Levett et al. | 709/223 |
| 2004/0162901 A1* | 8/2004 | Mangipudi et al. | 709/225 |
| 2006/0031926 A1* | 2/2006 | Shoham | G06F 21/41 726/8 |
| 2006/0168221 A1* | 7/2006 | Juhls et al. | 709/225 |
| 2006/0282528 A1* | 12/2006 | Madams | H04L 12/58 709/224 |
| 2007/0011261 A1 | 1/2007 | Madams et al. | |
| 2007/0208711 A1* | 9/2007 | Rhoads et al. | 707/3 |
| 2007/0208734 A1* | 9/2007 | Koide et al. | 707/5 |
| 2007/0208744 A1* | 9/2007 | Krishnaprasad et al. | 707/9 |
| 2007/0208745 A1* | 9/2007 | Ture et al. | 707/9 |
| 2007/0209080 A1* | 9/2007 | Ture et al. | 726/28 |
| 2008/0010665 A1* | 1/2008 | Hinton et al. | 726/1 |
| 2008/0059804 A1* | 3/2008 | Shah | G06F 21/41 713/186 |
| 2009/0013388 A1* | 1/2009 | Holvey et al. | 726/5 |
| 2009/0164795 A1 | 6/2009 | Justus et al. | |
| 2009/0217367 A1* | 8/2009 | Norman | H04L 63/0815 726/8 |
| 2010/0191960 A1* | 7/2010 | Beck | G06F 21/34 713/156 |
| 2010/0191983 A1* | 7/2010 | Yami | G06F 21/608 713/193 |
| 2011/0010543 A1* | 1/2011 | Schmidt | H04W 12/10 713/168 |
| 2011/0078437 A1* | 3/2011 | Reddy | 713/155 |
| 2011/0090898 A1* | 4/2011 | Patel et al. | 370/352 |
| 2011/0124313 A1* | 5/2011 | Jones | 455/406 |
| 2011/0277026 A1* | 11/2011 | Agarwal | G06F 21/41 726/8 |
| 2011/0277027 A1* | 11/2011 | Hayton | H04L 63/0884 726/8 |
| 2011/0283347 A1* | 11/2011 | Bhuta | H04L 63/0807 726/9 |
| 2012/0096365 A1* | 4/2012 | Wilkinson et al. | 715/740 |
| 2012/0209686 A1* | 8/2012 | Horowitz et al. | 705/14.26 |
| 2012/0246215 A1* | 9/2012 | Gopshtein et al. | 709/202 |
| 2012/0272304 A1* | 10/2012 | Liao et al. | 726/6 |
| 2012/0291114 A1 | 11/2012 | Poliashenko | |
| 2012/0331536 A1* | 12/2012 | Chabbewal | G06F 21/33 726/7 |
| 2013/0007716 A1* | 1/2013 | Bates | 717/125 |
| 2013/0014244 A1* | 1/2013 | Kranendonk et al. | 726/8 |
| 2013/0086102 A1* | 4/2013 | Addala et al. | 707/769 |
| 2013/0086146 A1* | 4/2013 | Addala et al. | 709/203 |
| 2013/0091273 A1 | 4/2013 | Ly et al. | |
| 2013/0125226 A1* | 5/2013 | Shah | H04L 63/0815 726/7 |
| 2013/0174241 A1* | 7/2013 | Cha | H04L 63/0815 726/7 |
| 2013/0198242 A1* | 8/2013 | Levy | 707/803 |
| 2013/0269017 A1* | 10/2013 | Patil | G06F 21/41 726/8 |
| 2013/0339533 A1 | 12/2013 | Neerincx et al. | |
| 2014/0001297 A1* | 1/2014 | Erbe | 709/228 |
| 2014/0059205 A1* | 2/2014 | Mohammed et al. | 709/224 |
| 2014/0101733 A1* | 4/2014 | Cain | 726/5 |
| 2014/0108139 A1* | 4/2014 | Weinstein | G06Q 30/02 705/14.53 |
| 2014/0165150 A1* | 6/2014 | Brunswig | G06F 21/41 726/4 |
| 2014/0181944 A1* | 6/2014 | Ahmed | H04W 12/06 726/8 |
| 2014/0222892 A1 | 8/2014 | Lee et al. | |
| 2014/0230027 A1* | 8/2014 | Cha | H04L 63/0815 726/5 |
| 2014/0258547 A1 | 9/2014 | Scavo et al. | |
| 2014/0259134 A1* | 9/2014 | Scavo | H04L 67/141 726/7 |
| 2016/0381002 A1 | 12/2016 | Desai | |

OTHER PUBLICATIONS

Merriam-Wbster, "integrate", 2016.*
Merriam-Webster, "integration", 2016.*
Zhou, "How does Google single sign on Work?", "Understanding SAML-based SSO for Google Apps", 2014.*
Extended Search Report for European Application No. 14158376.5 dated Dec. 5, 2014 (7 pgs.).
United States Patent and Trademark Office, Notice of Allowance for U.S. Appl. No. 14/690,956, Mar. 9, 2017, 10 pages, USA.

* cited by examiner

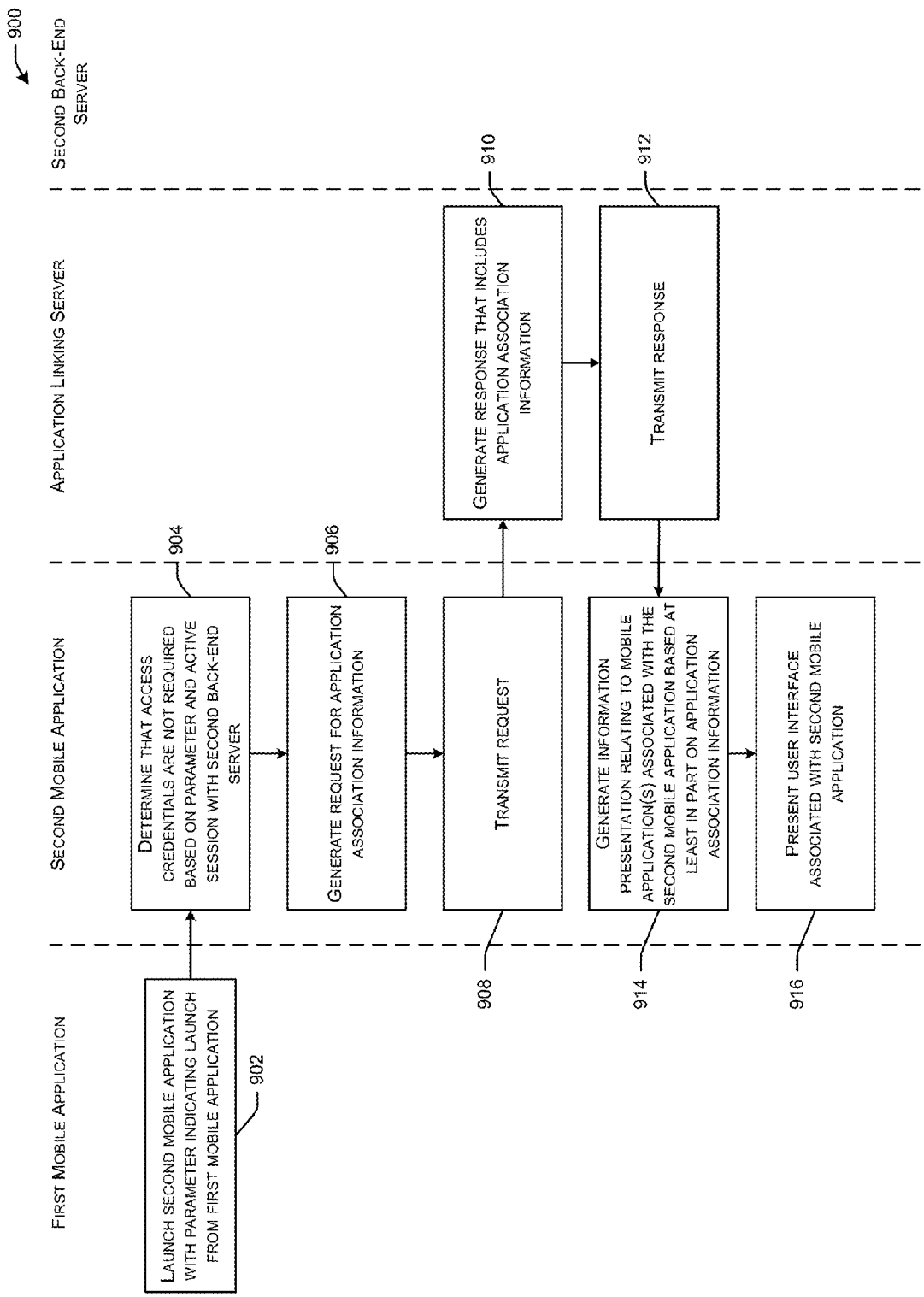

SINGLE SIGN-ON PROCESSING FOR ASSOCIATED MOBILE APPLICATIONS

BACKGROUND

In our increasingly mobile-centric world, a vast number of mobile applications have been developed for supporting a variety of different types of functionality. For example, even though users continue to use traditional fat-client and web-based client applications to manage financial accounts, initiate and conduct financial transactions, or the like, the use of mobile applications capable of supporting such functionality has become increasingly common. Typically, mobile applications that provide access to secure information (e.g., financial account information) require a user to enter authentication credentials—based on which a back-end server storing the secure information can authenticate the user—before information can be exchanged between the mobile application and the back-end server or back-end server transaction processing can be performed on behalf of the user. Generally, users are required to supply authentication credentials for each mobile application that is launched and different mobile applications may be associated with different back-end servers that may require different sets of authentication credentials for authenticating the same user.

BRIEF DESCRIPTION OF THE DRAWINGS

The detailed description is set forth with reference to the accompanying drawings. The use of the same reference numerals indicates similar or identical items; however, different reference numerals may be used to indicate similar or identical items as well. Various embodiments may utilize element(s) and/or component(s) other than those illustrated in the drawings and some element(s) and/or component(s) may not be present in various embodiments. It should be appreciated that while singular terminology may be used to describe a component or element, a plural number of such components or elements may also be encompassed within the scope of the disclosure.

FIG. 9 depicts an illustrative processing flow for launching a second mobile application from a first mobile application and receiving application association information for generating an information presentation relating to associated mobile applications in accordance with one or more embodiments of the disclosure.

DETAILED DESCRIPTION

Overview

Figure 1:
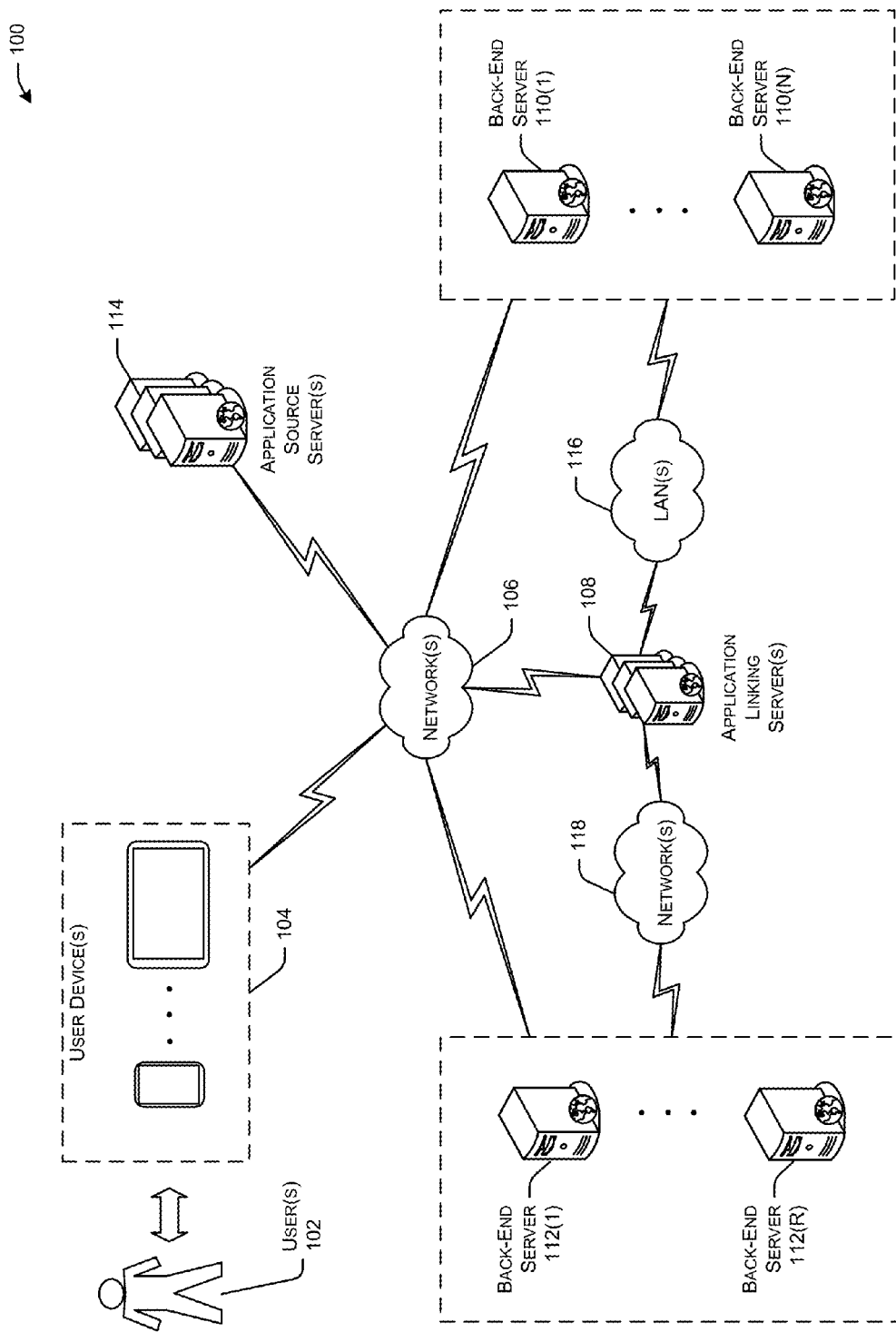
FIG. 1 is a schematic block diagram of an illustrative architecture that facilitates single sign-on processing for multiple associated mobile applications in accordance with one or more embodiments of the disclosure.

Embodiments of the disclosure relate to, among other things, systems, methods, computer-readable media, techniques and methodologies for performing single sign-on processing and enabling information exchange and information sharing between different client applications. In accordance with one or more embodiments of the disclosure, single sign-on processing may include processing to generate an interaction session between a user and a back-end server associated with a mobile application based at least in part on one or more existing interaction sessions between the user and one or more back-end servers associated with one or more other mobile applications. In order to establish an interaction session with an associated back-end server, a mobile application may leverage existing interaction sessions that have already been established in connection with the launching of other associated mobile applications. As such, embodiments of the disclosure provide for integration of multiple mobile applications and elimination of the need for multiple user authentications.

It should be appreciated that while illustrative embodiments of the disclosure may be described herein in the context of mobile applications and mobile computing environments, the disclosure is not limited to mobile applications and may be extended to any suitable client application including fat client applications that perform the bulk of data processing operations with minimal reliance on server(s), thin client applications such as traditional web-based client applications that rely heavily on server(s) for execution of data processing operations, and/or hybrid client applications that include aspects of both fat client computing models and thin client computing models.

In one or more illustrative embodiments, a user may launch a first mobile application executable on a mobile device and within a mobile computing environment. The first mobile application may prompt the user for authentication credentials based on which a back-end server associated with the first mobile application may authenticate the user. The authentication credentials may include any suitable information based on which the back-end server may unambiguously identify and authenticate the user such as, for example, a back-end specific user id and associated password. Although various embodiments of the disclosure may be described in the context of a mobile application associated with a single back-end server, it should be appreciated that a mobile application may be associated with multiple back-end servers, with one or more such back-end servers potentially utilizing different sets of authentication credentials for authenticating the user. Further, the term "back-end server" is intended to encompass a back-end system that may include various other software, hardware, firmware, and/or networking components in addition to the back-end server.

An application linking server may be provided to coordinate the authentication processing by receiving the authentication credentials from the first mobile application, generating a sign-in request that may be appropriately formatted in accordance with formatting requirements of the back-end server, and transmitting the sign-in request to the back-end server for authentication of the user. In certain embodiments, the application linking server may receive an identifier associated with the back-end server from the first mobile application. The application linking server may further receive, from the first mobile application, information identifying a network location of the back-end server and/or information identifying appropriate protocol(s) for interacting with the back-end server, or in the alternative, the application linking server may access at least a portion of such information from one or more datastores.

Upon authentication of the user, the back-end server may establish an interaction session associated with the first mobile application and/or the user. The interaction session may enable interaction between the first mobile application and the back-end server on behalf of the user. The back-end server may provide a session identifier (e.g., a session token) indicative of the established interaction session to the application linking server. The application linking server may then transmit the back-end server session identifier as well as a session identifier associated with interaction with the application linking server to the first mobile application. As will be described in greater detail hereinafter, the interaction session established with the back-end server associated with the first mobile application may be utilized by other mobile applications if such applications are also associated with the same back-end server. That is, as used herein the term "interaction session" may refer to a communication session associated with a particular user that enables communication—potentially responsive to user input—between one or more client applications and one or more associated back-end servers. It should be appreciated that a mobile application may be associated with more than one back-end server, in which case, a user may need to be authenticated with each such back-end server prior to enabling interaction between the mobile application and each associated back-end server.

In one or more illustrative embodiments, upon authentication of a user and receipt of an associated session identifier, the first mobile application described above may receive, from the application linking server, application association information relating to one or more other mobile applications associated with the first mobile application. The first mobile application may be configured to generate an information presentation based at least in part on the application association information and present the information presentation to the authenticated user via a user interface of the first mobile application. A user may be able to navigate to the user interface that displays the information presentation from various other user interfaces associated with the first mobile application. In certain embodiments, the user interface for presenting the information presentation may be dynamically generated in response to user navigation to the user interface from within the first mobile application.

The information presentation may present information relating to other mobile application(s) associated with the first mobile application. The association between the first mobile application and other mobile application(s) may be based at least in part on one or more association criteria. The association criteria may include any suitable criteria including, but not limited to, a same issuing entity being associated with each of the mobile applications. The issuing entity may be identifiable from a certificate associated with each of the associated mobile applications or from respective information that is embedded in each of the associated mobile applications during a signing process and that tracks back to the issuing entity.

The information presentation may include various status indicators that identify a respective status associated with each of the various associated mobile applications identified in the information presentation. The status indicators may indicate a download or integration status for each associated mobile application. Information that identifies the respective status indicator according to which each associated mobile application is to be categorized in the information presentation may be supplied by a user device on which the associated mobile applications are executable.

As a non-limiting example, the information presentation may include a first indicator that identifies those associated mobile applications that have been downloaded to the user device and which are fully integrated and capable of leveraging single sign-on processing. The information presentation may further include a second indicator that identifies those associated mobile applications that have not yet been downloaded to the user device but which are available for download from one or more application source servers. In certain computing environments (e.g., operating system environments), a third indicator may be provided that identifies any associated mobile applications that have been downloaded to the mobile device but which have not yet been fully integrated so as to be able to leverage single sign-on processing. Processing for integrating an associated mobile application that has been downloaded to a mobile device will be described in more detail hereinafter.

In one or more illustrative embodiments, the first application may receive input indicative of a user selection of a second, fully-integrated mobile application from the information presentation presented via a user interface associated with the first mobile application. For ease of explanation, the processing flow described hereinafter will be described in the context of the first mobile application being associated with a first back-end server and the second mobile application being associated with a second back-end server. However, it should be appreciated that the first mobile application and/or the second mobile application may each be associated with a respective set of one or more back-end servers, of which one or more may represent a same back-end server.

Upon receipt of an indication of user interaction with the information presentation corresponding to a launching of the second application, a determination may be made as to whether a non-expired interaction session on behalf of the user already exists with the second back-end server. If a current, non-expired interaction session exists, the second mobile application may interact with the second back-end server based at least in part on the existing interaction session. Such an interaction session may have already been established as a result of authentication processing previously performed with respect to the second mobile application or another mobile application that is also associated with the second back-end server, or may have been established as a result of single sign-on processing previously performed with respect to the second mobile application or another mobile application associated with the second back-end server.

If a current, non-expired interaction session with the second back-end server does not exist, single sign-on processing may be performed to establish an interaction session with the second back-end server. As part of the single sign-on processing, the first mobile application may generate and transmit, to the application linking server, a request for a second back-end server session identifier indicative of establishment of an interaction session with the second back-end server. The request for the second back-end server session identifier may include various information including, but not limited to, an identifier associated with a first back-end server with which the first mobile application is associated, a first back-end server session identifier associated with an existing interaction session with the first back-end server, an identifier associated with the second back-end server, and so forth. The request for the second back-end server session identifier may be associated with or may further include a session identifier associated with an interaction session with the application linking server.

Upon receipt of the request, the application linking server may perform validation processing to ensure that the request is received from a trusted party authorized to submit such requests and to ensure that the request is received from a mobile application associated with a current interaction session with the application linking server. Upon successful completion of any validation processing that may be performed by the application linking server, single sign-on processing may continue with the application linking server generating a request for identifiers associated with the user. The application linking server may communicate the identifiers request to the first back-end server. The request may be a request for all identifiers associated with the user that are known to the first back-end server or may be a request for a subset of identifiers (e.g., those identifiers that the second back-end server is able to use to identify the user).

The first back-end server may receive the request and generate and transmit, to the application linking server, a response that includes the requested identifiers. Upon receipt of the response from the first back-end server, the application linking server may optionally filter the identifiers included in the response to identify those that are recognizable by the second back-end server and generate and transmit, to the second back-end server, a second back-end session identifier request. In certain embodiments, if more than one identifier received from the first back-end server may be used by the second back-end server to identify the user, the application linking server may utilize one or more prioritization criteria to prioritize the identifiers and may serially communicate the identifiers to the second back-end server in accordance with the determined priority until the user is successfully identified by the second back-end server and an associated interaction session is established. The one or more prioritization criteria may include, for example, a likelihood of success in identifying and authenticating the user and establishing an interaction session with the second back-end server.

Upon receipt of the second back-end session identifier request, the second back-end server may first verify that the request is received from an entity authorized to present such a request (e.g., the application linking server). The second back-end server may then utilize one or more of the identifiers included in the request to identify the user and may establish an interaction session and generate and transmit, to the application linking server, a response that includes a second back-end server session identifier associated with the newly established interaction session. Upon receipt of the second back-end server session identifier, the application linking server may communicate the second back-end server session identifier as well as other information such as, for example, an updated session identifier associated with the interaction session with the application linking server to the first mobile application. The first mobile application may store the second back-end server session identifier and the updated session identifier associated with the interaction session with the application linking server in secure storage on the user device such as, for example, in encrypted data storage.

The first mobile application may then launch the second mobile application with a parameter or other identifier indicating that the second mobile application was launched from a user interface associated with the first mobile application (e.g., the user interface displaying the information presentation). As part of the illustrative processing flow currently being described, the second mobile application may be configured to determine that it was launched as a result of user interaction with a user interface associated with the first mobile application, and may be further configured to determine that a current, non-expired interaction session exists with the second back-end server as indicated by the second back-end server session identifier obtained via the processing described earlier. Accordingly, the single sign-on processing is complete and the user has been successfully identified by the second back-end server without requiring the second mobile application to separately obtain authentication credentials from the user.

In one or more illustrative embodiments, a mobile application associated with multiple back-end servers may leverage the single sign-on processing described above to establish a respective interaction session with each such back-end server while only requiring the user to provide a single set of authentication credentials. For example, a mobile application may be launched and a set of authentication credentials may be received from a user, based on which, a first back-end server associated with the mobile application may authenticate the user and generate an interaction session with the first back-end server. Single sign-on processing as described above may then be leveraged in order to generate a respective interaction session with each additional back-end server with which the mobile application is associated. Identifiers associated with the user may be requested from any back-end server with which an interaction session has already been established, and in certain embodiments, back-end servers for which interaction sessions exist may be serially accessed until identifier(s) are provided based on which a back-end server with which an interaction session is sought is capable of identifying the user.

In accordance with one or more embodiments of the disclosure, communication of requests, responses, messages, or any other information between any two devices or systems (e.g., the application linking server, the back-end server(s), mobile applications(s), etc.) may occur in accordance with any suitable communication protocol, methodology or technique including, but not limited to, as part of a Web service Application Programming Interface (API) invocation.

One or more illustrative embodiments of the disclosure have been described above. These and other embodiments of the disclosure will be described in more detail hereinafter through reference to accompanying drawings.

Illustrative Architecture

FIG. 1 schematically depicts an illustrative networked architecture 100 that facilitates single sign-on processing for a set of associated mobile applications in accordance with one or more embodiments of the disclosure. The terms "associated application" or "associated mobile application" may be used herein at times to refer to any application in the set of associated mobile applications.

The illustrative architecture 100 may include one or more user devices 104 operable by one or more users 102, one or more application linking servers 108, one or more back-end servers 110(1)-110(N), one or more back-end servers 112(1)-112(R), and one or more application source servers 114. It should be appreciated that while one or more components of the illustrative architecture 100 may be described in the singular, a plural number of any such component(s) (potentially forming part of a system that includes additional hardware, software, firmware, and/or networking components) is also encompassed by this disclosure.

The user device(s) 104 may include any suitable computing device including, but not limited to, any suitable mobile computing device such as, for example, a smartphone device, a tablet device, or the like. The user device(s) 104 may be associated with any suitable operating system/computing environment. While various embodiments of the disclosure may be described in the context of mobile computing devices and mobile applications, it should be appreciated that the disclosure extends to any suitable computing device (e.g., a desktop computer, a laptop computer, a workstation, etc.) capable of executing any suitable client application within any suitable computing environment.

In one or more embodiments of the disclosure, the user device(s) 104 may be associated with one or more mobile operating system environments including, but not limited to, an iOS® operating system environment, an Android® operating system environment, a Windows® Mobile operating system environment, or any other suitable mobile operating system environment or platform. Any of a variety of mobile applications may be executable on the user device(s) 104. In one or more embodiments of the disclosure, each of the user device(s) 104 may be configured to download and install various mobile applications forming part of a set of associated applications. Each application in the set of associated mobile applications may be associated with each other mobile application in the set based at least in part on one or more association criteria. The one or more association criteria may include any suitable criteria including, but not limited to, a same issuing or signing entity being associated with each mobile application in the set of associated applications.

As described in more detail hereinafter, each associated mobile application may be configured to be downloaded, integrated, and/or launched from a user interface associated with another associated mobile application. Further, each associated mobile application may be configured to be launched from a mobile device "home screen" or other user interface associated with an operating system environment of the mobile device that is independent of other associated mobile applications. In certain embodiments and as will be described in more detail hereinafter, an associated mobile application that is launched from a mobile device "home screen" may not be able to leverage single sign-on processing and may prompt a user for authentication credentials upon launch from the device "home screen" regardless of whether active interaction session(s) exist with associated back-end servers. In other embodiments, while not being able to directly leverage single sign-on processing, an associated mobile application launched from the device "home screen" may not prompt the user for authentication credentials if active interaction session(s) already exist for associated back-end server(s).

The user device(s) 104 may be communicatively coupled with the back-end server(s) 110(1)-110(N), the back-end server(s) 112(1)-112(R), the application linking server 108, and/or the application source server 114 via one or more networks 106. The network(s) 106 may include, but are not limited to, any one or a combination of different types of suitable communications networks, such as cable networks, wireless networks, cellular networks, or any other private (e.g., frame relay networks) and/or public networks (e.g., the Internet) including networks of any scope of coverage such as metropolitan-area networks (MANs), wide-area networks (WANs), local area networks (LANs), and so forth. Further, the network(s) 106 may include any suitable data transmission medium including, but not limited to, coaxial cable, twisted wire pair, optical fiber, hybrid fiber coaxial (HFC), microwave terrestrial transceivers, radio frequency communications, satellite communications, or combinations thereof.

The application source server 114 may store any of variety of mobile applications including any of the mobile applications in the set of associated mobile applications. The application source server 114 may support functionality for transmitting mobile applications to the user device(s) 104 via one or more of the network(s) 106 responsive to a request received from the user device(s) 104 to download the mobile applications. The application source server 114 may be hosted by any suitable entity including, but not limited to, an operating system vendor, a mobile device vendor, and so forth.

The application linking server 108 may support a variety of functionality including authentication processing and single sign-on processing in accordance with one or more embodiments of the disclosure. In addition, the application linking server 108 may store or may be configured to access one or more datastore(s) (not shown) storing a variety of types of information including, but not limited to, session identifier(s) associated with interaction session(s) with the application linking server 108, back-end server session identifier(s) associated with interaction session(s) with various back-end server(s), respective identifiers associated with back-end servers, application association information, and so forth. Each back-end server session identifier may be stored in association with a user and/or mobile application identifier in order to establish session state indicative of the interaction session between the user (or mobile application) and the associated back-end server. The application linking server 108 may further optionally store or access from one or more datastore(s) respective data associated with specific back-end servers, information associated with network locations of back-end servers, and/or information associated with communication protocols for use in interacting with back-end servers.

As will be described in more detail hereinafter, the application association information may include a respective identifier associated with each associated mobile application, respective back-end server identification information identifying a respective set of one or more back-end servers associated with each associated mobile application, respective metadata associated with each associated mobile application, and so forth. The respective metadata associated with each mobile application in the set of associated mobile applications may include, but is not limited to, a title associated with the mobile application, a Uniform Resource Locator (URL) that identifies a location from which an icon associated with the mobile application may be retrieved, one or more internal identifiers associated with the mobile application, a URL that identifies a location (e.g., a network address of an application source server) from which the mobile application may be downloaded, and so forth. As will be described in more detail hereinafter, the application association information may be utilized in conjunction with information locally stored on the user device (e.g., status indicator information) to generate an information presentation relating to the set of associated mobile applications.

The illustrative architecture 100 may further include one or more back-end servers 110(1)-110(N) that may be co-located with the application linking server 108. The back-end server(s) 110(1)-110(N) may be communicatively coupled with the application linking server 108 via one or more local area networks (LANs) 116 or other suitable network(s). As used herein, the term "co-located" may refer to any two or more components that are hosted by a same entity, physically located at a same site, configured to communicate with each other over a local area network (LAN), or the like. In addition, the back-end server(s) 110(1)-110(N) may be further configured to communicate with any other illustrative components of the illustrative architecture 100 via one or more of the network(s) 106 (e.g., the application linking server 108, the application source server 114, one or more of the back-end server(s) 112(1)-112(R), etc.).

The illustrative architecture 100 may further include one or more back-end servers 112(1)-112(R) that may be communicatively coupled with the application linking server 108 via one or more networks 118, which may include any one or more of the types of networks described through reference to the network(s) 106. In certain embodiments, the back-end server(s) 112(1)-112(R) may be located remotely from the application linking server 108. The back-end server(s) 112(1)-112(R) may further be configured to communicate with the user device(s) 104 via one or more of the network(s) 106 such as, for example, for information exchange with one or more of the mobile applications in the set of mobile associated applications. In addition, the back-end server(s) 112(1)-112(R) may be further configured to communicate with any other illustrative components of the illustrative architecture 100 via one or more of the network(s) 106 (e.g., the application linking server 108, the application source server 114, one or more of the back-end server(s) 110(1)-110(N), etc.).

While the back-end server(s) 110(1)-110(N) and the back-end server(s) 112(1)-112(R) have been separately depicted in FIG. 1 to illustrate potential differences in the manner in which they may be communicatively coupled to the application linking server 108, the back-end server(s) 110(1)-110(N) and the back-end server(s) 112(1)-112(R) will be generically referred to hereinafter as back-end server(s) 110/112. Each back-end server 110/112 may host at least a portion of the functionality associated with one or more mobile applications including one or more applications in the set of associated mobile applications. Each back-end server 110/112 may further store data accessed by one or more of the associated mobile applications. Each associated mobile application may be associated with and may access one or more back-end servers 110/112. In certain embodiments, a user 102 may be associated with a corresponding user account at each back-end server 110/112 that is associated with each mobile application in the set of associated mobile applications that has been downloaded to a user device 104 associated with the user 102. Each user account may be associated with a corresponding set of user authentication credentials based on which a corresponding back-end server may authenticate the user, as well as other user identifiers and/or user-related information. In certain embodiments, each back-end server 110/112 may utilize a different set of user authentication credentials to authenticate a user. Accordingly, a single common identifier or set of authentication credentials may not be available for authenticating a user with each back-end server 110/112.

It should be appreciated that individual instances of the application source server(s) 114, the application linking server(s) 108, or the back-end server(s) 110(1)-110(N), 112(1)-112(R) may each be hosted or controlled by one or more entities including potentially one or more same entities. Further, in those scenarios in which any of the components of the illustrative architecture depicted in FIG. 1 are hosted by a same entity, the components may be provided at different locations.

Those of ordinary skill in the art will appreciate that the illustrative networked architecture 100 depicted in FIG. 1 is provided by way of example only. Numerous other operating environments, system architectures, and device configurations are within the scope of this disclosure. Various embodiments of the disclosure may include fewer or greater numbers of components and/or devices than those depicted in FIG. 1 and may incorporate some or all of the functionality described with respect to the illustrative architecture 100 depicted in FIG. 1, or additional functionality.

Figure 2:
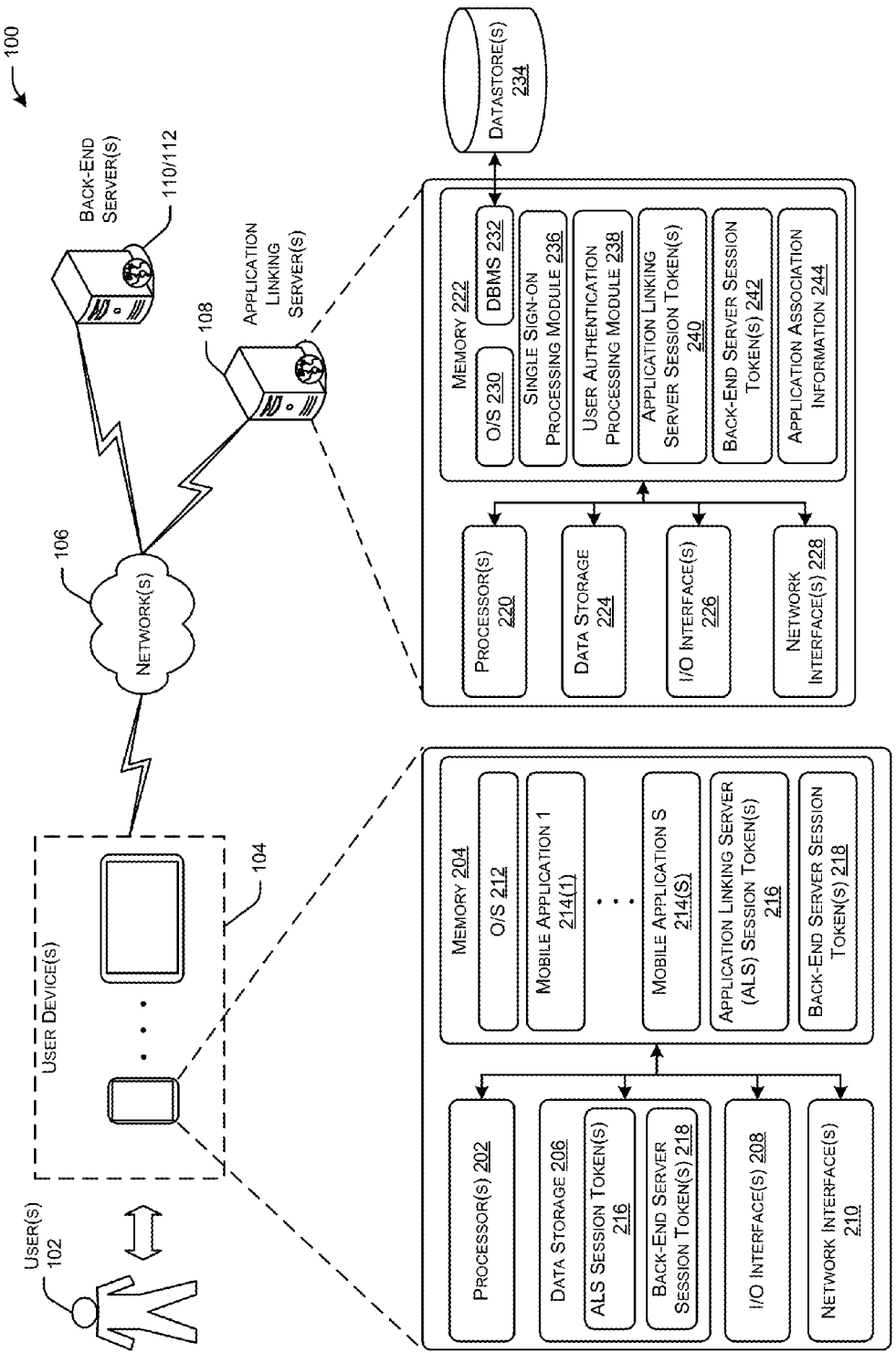
FIG. 2 is a more detailed schematic block diagram illustrating various hardware and software sub-components of various components of the illustrative architecture of FIG. 1 in accordance with one or more embodiments of the disclosure.

FIG. 2 is a more detailed schematic block diagram illustrating various hardware and software sub-components of various components of the illustrative architecture of FIG. 1 in accordance with one or more embodiments of the disclosure.

As depicted in FIG. 2, an illustrative user device 104 in accordance with one or more embodiments of the disclosure may include one or more memory devices 204 (generically referred to herein as memory 204) and one or more processors (processor(s)) 202 configured to execute computer-executable instructions that may be stored in the memory 204. As previously noted, while embodiments of the disclosure may be described in the context of a user device 104 that is a mobile computing device such as a smartphone device, a tablet device, or the like, the user device 104 may be any suitable computing device including, but not limited to, a server computing device, a desktop computing device, a laptop computing device, a mobile computing device, a mainframe computing device, and so forth.

The processor(s) 202 may include any suitable processing unit capable of accepting digital data as input, processing the input data in accordance with stored computer-executable instructions, and generating output data. The processor(s) 202 may be configured to execute the computer-executable instructions to cause or facilitate the performance of various operations. The processor(s) 202 may include any type of suitable processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a Field-Programmable Gate Array (FPGA), a System-on-a-Chip (SoC), and so forth.

The memory 204 may store computer-executable instructions that are loadable and executable by the processor(s) 202 as well as data manipulated and/or generated by the processor(s) 202 during the execution of the computer-executable instructions. The memory 204 may include volatile memory (memory that maintains its state when supplied with power) such as random access memory (RAM) and/or non-volatile memory (memory that maintains its state even when not supplied with power) such as read-only memory (ROM), flash memory, and so forth. In various implementations, the memory 204 may include multiple different types of memory, such as static random access memory (SRAM), dynamic random access memory (DRAM), unalterable ROM, and/or writeable variants of ROM such as electrically erasable programmable read-only memory (EEPROM), flash memory, and so forth.

The user device 104 may further include additional data storage 206 such as removable storage and/or non-removable storage including, but not limited to, magnetic storage, optical disk storage, and/or tape storage. Data storage 206 may provide storage of computer-executable instructions and/or other data. The data storage 206 may include storage that is internal and/or external to the user device 104. The memory 204 and/or the data storage 206, removable and/or non-removable, are all examples of computer-readable storage media (CRSM).

The memory 204 may store data, computer-executable instructions, applications, and/or various program modules including, for example, one or more operating systems 212, one or more associated mobile applications 214(1)-214(S), one or more application linking server (ALS) session identifiers 216 associated with one or more interaction sessions with the application linking server 108, and/or one or more back-end server session identifiers 218 associated with one or more interaction sessions with one or more back-end servers 110/112. The terms "session identifier" and "session token" may be used interchangeably throughout this disclosure and the accompanying drawings.

The operating system (O/S) 212 may provide an interface between other application software executing on the user device 104 (e.g., the mobile applications 214(1)-214(S)) and hardware resources of the user device 104. More specifically, the O/S 212 may include a set of computer-executable instructions for managing hardware resources of the user device 104 and for providing common services to other applications (e.g., managing memory allocation among various applications). The O/S 212 may include any operating system now known or which may be developed in the future including, but not limited to, any mobile operating system, any desktop or laptop operating system, any mainframe or server operating system, or any other proprietary or freely available operating system.

The memory 204 may further include one or more associated mobile applications 214(1)-214(S) loaded therein. At times herein, any particular mobile application of the one or more mobile applications 214(1)-214(S) may be referred to generically as mobile application 214 or associated mobile application 214. Each of the mobile applications 214(1)-214(S) may form part of a set of associated mobile applications that are associated based at least in part on one or more association criteria. Each of the mobile applications 214(1)-214(S) may include one or more program modules comprising computer-executable instructions that responsive to execution by the processor(s) 202 cause various aspects of authentication processing and single sign-on processing to be performed in accordance with one or more embodiments of the disclosure.

Each of the mobile applications 214(1)-214(S) may further include one or more program modules comprising computer-executable instructions that responsive to execution by the processor(s) 202 cause various automated processing to be performed, including processing that causes an information presentation to be generated and presented to a user 102 of the user device 104 based at least in part on application association information associated with the set of associated mobile applications 214(1)-214(S). Each of the associated mobile applications 214(1)-214(S) may include a respective user interface for presenting the information presentation. In various embodiments of the disclosure, the information presentation may be dynamically generated or regenerated responsive to navigation by the user 102 to a particular user interface from within a mobile application. Although not depicted in FIG. 2, the application association information may be stored in association with one or more of the mobile applications 214(1)-214(S). As will be described in more detail hereinafter, a mobile application 214 may receive the application association information as part of authentication processing coordinated by the application linking server 108, according to which a back-end server associated with the mobile application 214 authenticates a user 102 of the user device 104 based on authentication credentials received from the user 102. Alternatively, a mobile application 214 may receive the application association information as part of single sign-on processing in which the mobile application 214 is launched from an information presentation presented via a user interface associated with another mobile application 214.

As previously noted, one or more ALS session identifiers 216 associated with one or more interaction sessions with the application linking server 108 and/or one or more back-end server session identifiers 218 associated with one or more interaction sessions with one or more back-end servers 110/112 may also be stored in the memory 204. Further, as depicted in FIG. 2, the one or more ALS session identifiers 216 and/or the one or more back-end server session identifiers 218 may be stored in the data storage 206 such as, for example, in an encrypted portion of the data storage 206.

In accordance with one or more embodiments of the disclosure, each time a mobile application (e.g., 214(1)) of the set of one or more associated mobile applications 214(1)-214(S) is launched from a user interface of the user device 104 that is independent of any of the other mobile applications (e.g., a "home screen" of the user device 104), the mobile application may prompt the user for one or more sets of authentication credentials, based on which, authentication processing may be performed to authenticate the user with one or more associated back-end servers 110/112. In certain embodiments, in order to maintain a consistent, uniform or predictable user experience, the mobile application may prompt the user for authentication credentials when launched from the user device 104 "home screen" regardless of whether one or more active interaction sessions exist with back-end server(s) associated with the mobile application. As part of the authenticating processing performed upon launching of the mobile application from the user device 104 "home screen," a new interaction session with the application linking server 108 may be established and a new ALS session identifier 216 indicative thereof may be generated. The newly generated ALS session identifier 216 may be received by the launched mobile application from the application linking server 108 and may be stored in the memory 204 and/or an encrypted portion of the data storage 206. In contrast, each time a mobile application (e.g., 214(1)) of the set of associated mobile applications 214(1)-214(S) is launched from within another mobile application (e.g., 214(S)) that is associated with existing interaction session with the application linking server 108, the associated ALS session identifier 216 may be updated and the existing ALS session identifier 216 may be overwritten with the updated ALS session identifier.

In certain other embodiments, if a respective active, non-expired interaction session exists with each back-end server 110/112 with which the launched mobile application is associated, the mobile application may not prompt the user for authentication credentials and may interact with associated back-end server(s) 110/112 based on the existing interaction session(s).

In accordance with one or more embodiments of the disclosure, an interaction session with a back-end server 110/112 and an associated back-end server session identifier 218 indicative thereof may be generated as part of authentication processing performed upon launching of a first mobile application (e.g., 214(1)) and based on a set of authentication credentials received from a user 102. In the above scenario, the first mobile application 214(1) that was launched may receive the back-end server session identifier 218 and store the identifier 218 in the memory 204 and/or the data storage 206. Alternatively, upon launching of a second mobile application (e.g., 214(S)) based on user interaction with a user interface that presents the information presentation and which is associated with the first mobile application (e.g., 214(1)), an interaction session with a back-end server 110/112 associated with the second mobile application 214(S) may be established and an associated back-end server session identifier 218 indicative thereof may be generated as part of single sign-on processing that leverages one or more interaction sessions that have already been established with one or more other back-end servers 110/112. In this scenario, the generated back-end server session identifier 218 may be transmitted from the back-end server 110/112 associated with the second mobile application 214(S) via the application linking server 108 to the first mobile application 214(1). The first mobile application 214(1) may include computer-executable instructions that responsive to execution by the processor(s) 202 cause the received back-end server session identifier 218 to be stored in the memory 204 and/or an encrypted portion of the data storage 206.

In accordance with one or more embodiments of the disclosure, back-end server session identifier(s) 218 stored in the memory and/or the data storage 206 may be utilized by any of the set of associated mobile applications 214(1)-214(S) that are associated with back-end server(s) 110/112 to which the back-end server session identifier(s) 218 correspond. In certain embodiments, the back-end server session identifier(s) 218 and/or the ALS session identifier(s) 216 may be stored in an encrypted portion of the data storage 206 that is accessible by only those mobile applications in the set of associated mobile applications 214(1)-214(S). In various embodiments, one or more identifiers may be associated with each mobile application in the set of associated mobile applications 214(1)-214(S) identifying each such mobile application as an associated mobile application that is permitted to access the encrypted portion of the data storage 206 storing the session identifier(s) 216 and the session identifier(s) 218. As a non-limiting example, each mobile application in the set of associated mobile applications may be associated with an identifier (e.g., a certificate, embedded information, etc.) that indicates that each mobile application is associated with a same issuing entity.

Although not depicted in FIG. 2, it should be appreciated that the memory 204 may store any number of additional applications, program modules, and/or data. For example, as previously alluded to, application association information received from the application linking server 108 may be stored in the memory 204. Further, status indicator information that is sourced from the user device 104 may also be stored in the memory 204. The status indicator information may associate each of the mobile applications 214(1)-214(S) with a respective indicator that indicates a status of the mobile application on the user device 104 (e.g., downloaded and fully integrated for leveraging single sign-on processing, downloaded but not fully integrated, not downloaded, etc.). Further, although also not depicted in FIG. 2, the data storage 206 may store a variety of additional types of data, applications, and/or program modules. For example, the data storage 206 may store the set of associated mobile applications 214(1)-214(S), the application association information, the status indicator information, and so forth.

The user device 104 may further include one or more I/O interfaces 208 that facilitate receipt, by the user device 104, of information input via one or more I/O devices associated with the user device 104 as well as the outputting of information from the user device 104 to the one or more I/O devices for presentation to a user 102. The I/O devices may include, for example, one or more user interface devices that facilitate interaction between a user 102 and the user device 104 including, but not limited to, a display, a keypad, a keyboard, a pointing device, a control panel, a touch screen display, a remote control device, a speaker, a microphone, and so forth. As a non-limiting example, the one or more I/O interfaces 208 may facilitate interaction between a user 102 and the user device 104 to facilitate the launching of any of the mobile applications 214(1)-214(S) and associated authentication processing and/or single sign-on processing.

FIG. 2 additionally depicts various illustrative software, hardware, and/or firmware components of an illustrative application linking server 108 in accordance with one or more embodiments of the disclosure. The application linking server 108 may include one or more memories 222 (generically referred to herein as memory 222) and one or more processors (processor(s)) 220 configured to execute computer-executable instructions that may be stored in the memory 222. The application linking server 108 may be any suitable computing device including, but not limited to, a server computer, a mainframe computer, and so forth. It should be appreciated that functionality described as being supported by the application linking server 108 may, in various embodiments, be supported by an application linking system comprising one or more application linking servers 108 and potentially additional software, firmware, and/or hardware components. Further, processing described as being performed or facilitated by the application linking server 108 may, in various embodiments, be performed or facilitated in a distributed fashion by a plurality of application linking servers 108.

The processor(s) 220 may include any suitable processing unit capable of accepting digital data as input, processing the input data in accordance with stored computer-executable instructions, and generating output data. The processor(s) 220 may be configured to execute the computer-executable instructions to cause or facilitate the performance of various operations. The processor(s) 220 may include any type of suitable processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a Field-Programmable Gate Array (FPGA), a System-on-a-Chip (SoC), and so forth.

The memory 222 may store computer-executable instructions that are loadable and executable by the processor(s) 220 as well as data manipulated and/or generated by the processor(s) 220 during the execution of the computer-executable instructions. The memory 222 may include volatile memory (memory that maintains its state when supplied with power) such as random access memory (RAM) and/or non-volatile memory (memory that maintains its state even when not supplied with power) such as read-only memory (ROM), flash memory, and so forth. In various implementations, the memory 222 may include multiple different types of memory, such as static random access memory (SRAM), dynamic random access memory (DRAM), unalterable ROM, and/or writeable variants of ROM such as electrically erasable programmable read-only memory (EEPROM), flash memory, and so forth.

The application linking server 108 may further include additional data storage 224 such as removable storage and/or non-removable storage including, but not limited to, magnetic storage, optical disk storage, and/or tape storage. Data storage 224 may provide storage of computer-executable instructions and other data. The data storage 224 may include storage that is internal and/or external to the application linking server 108. The memory 222 and/or the data storage 224, removable and/or non-removable, are examples of computer-readable storage media (CRSM).

The memory 222 may store data, computer-executable instructions, applications, and/or various program modules including, for example, one or more operating systems 230, one or more database management systems (DBMS) 232, one or more program modules such as a single sign-on processing module 236 and a user authentication processing module 238, one or more ALS session identifiers 240 associated with one or more interaction sessions with the application linking server 108, one or more back-end server session identifiers 242 associated with one or more interaction sessions with one or more back-end servers 110/112, and/or application association information 244.

The operating system (O/S) 222 may provide an interface between other applications and/or program modules executable by the application linking server 108 (e.g., the single sign-on processing module 236, the user authentication processing module 238, etc.) and hardware resources of the server 108. More specifically, the O/S 230 may include a set of computer-executable instructions for managing hardware resources of the server 108 and for providing common services to other applications and/or program modules (e.g., managing memory allocation among various applications and/or program modules). The O/S 230 may include any operating system now known or which may be developed in the future including, but not limited to, any desktop or laptop operating system, any mobile operating system, any mainframe operating system, or any other proprietary or freely available operating system.

The single sign-on processing module 236 may include computer-executable instructions that responsive to execution by the processor(s) 220 cause various aspects of single sign-on processing to be performed in accordance with one or more embodiments of the disclosure. Further, the user authentication processing module 238 may include computer-executable instructions that responsive to execution by the processor(s) 220 cause various aspects of user authentication processing to be performed.

The ALS session identifier(s) 240 may be indicative of one or more interaction sessions with the application linking server 108. Each ALS session identifier 240 may be associated with an interaction session between the application linking server 108 and a particular user 102 and one or more of the associated applications 214(1)-214(S) executing on a particular user device 104 associated with the user 102. Accordingly, the ALS session identifier(s) 240 may include the ALS session identifier(s) 216 stored on the illustrative user device 104 depicted in FIG. 2 as well as additional ALS session identifiers associated with interaction sessions between the application linking server 108 and other users as well as associated mobile applications executing on other user devices 104 associated with the other users.

The back-end server session identifier(s) 242 may be associated with interaction sessions between one or more users 102 and one or more back-end servers 110/112. Each back-end server session identifier 242 may be associated with an interaction session between a particular back-end server 110/112 and a particular user 102 as well as one or more of the associated applications 214(1)-214(S) executing on a particular user device 104 associated with the user 102. Accordingly, the back-end server session identifier(s) 242 may include, in addition to the back-end server session identifier(s) 218 stored by the illustrative user device 104 depicted in FIG. 2, additional back-end server session identifiers associated with interaction sessions between back-end servers 110/112 and other users as well as associated mobile applications executing on other user devices 104 associated with the other users.

The memory 222 may further include DBMS 232 for accessing, retrieving, storing, and/or manipulating data stored in one or more datastores 234 provided externally to the application linking server 108 and/or one or more internal datastores provided, for example, as part of the data storage 224. The datastore(s) 234 and/or data storage 224 may store any of the data, program modules, and so forth (at least a subset of which may be managed by DBMS 232) depicted as being stored in the memory 222 and/or additional information such as identifiers associated with back-end servers 110/112, network locations and communication protocols associated with back-end servers 110/112, and so forth. The DBMS 232 may use any of a variety of database models (e.g., relational model, object model, etc.) and may support any of a variety of query languages.

Although not depicted in FIG. 2, it should be appreciated that the memory 222 and/or the data storage 224 may store any number of additional applications, program modules, and/or data. For example, the application association information 244 may additionally be stored in the data storage 224.

The application linking server 108 may further include one or more I/O interfaces 226 that facilitate receipt, by the application linking server 108, of information input via one or more I/O devices associated with the application linking server 108 as well as the outputting of information from the application linking server 108 to the one or more I/O devices. The I/O devices may include, but are not limited to, a display, a keypad, a keyboard, a pointing device, a control panel, a touch screen display, a remote control device, a speaker, a microphone, and so forth.

The application linking server 108 may further include one or more network interfaces 228 that may facilitate communication between the application linking server 108 and other components of the networked architecture 100 via one or more of the network(s) 106, network(s) 118, or LAN(s) 116. For example, the network interface(s) 228 may facilitate interaction between the application linking server and any of the associated mobile applications 214(1)-214(S), any of the back-end servers 110/112, and so forth.

While not depicted in FIG. 2, the back-end servers 110/112 and/or the application source server 114 may include one or more of the hardware and software components illustratively depicted in connection with the user device(s) 104 and/or the application linking server 108 as well as potentially alternate or additional hardware and software components.

Those of ordinary skill in the art will appreciate that any of the components of the architecture 100 may include alternate and/or additional hardware, software or firmware components beyond those described or depicted without departing from the scope of the disclosure. More particularly, it should be appreciated that software, firmware or hardware components depicted as forming part of any of the components of the architecture 100 are merely illustrative and that some components may not be present or additional components may be provided in various embodiments. While various program modules have been depicted and described with respect to various illustrative components of the architecture 100, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, firmware and/or hardware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules.

Illustrative Processes

Figure 3A:
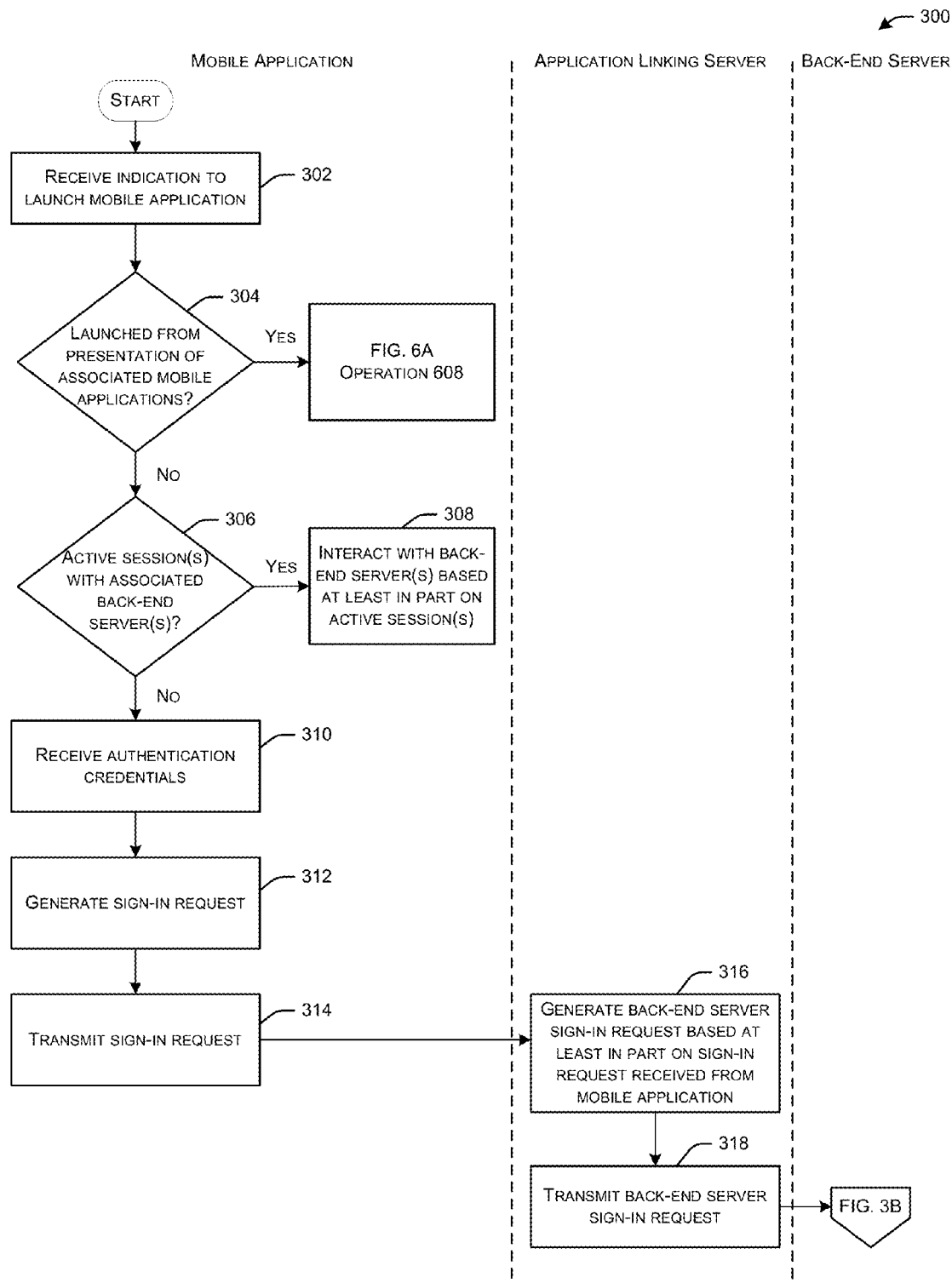
FIGS. 3A-3B depict an illustrative processing flow for authenticating a user of a mobile application based on authentication credentials associated with the user and generating an interaction session between the user and a back-end server associated with the mobile application in accordance with one or more embodiments of the disclosure.
Figure 3B:
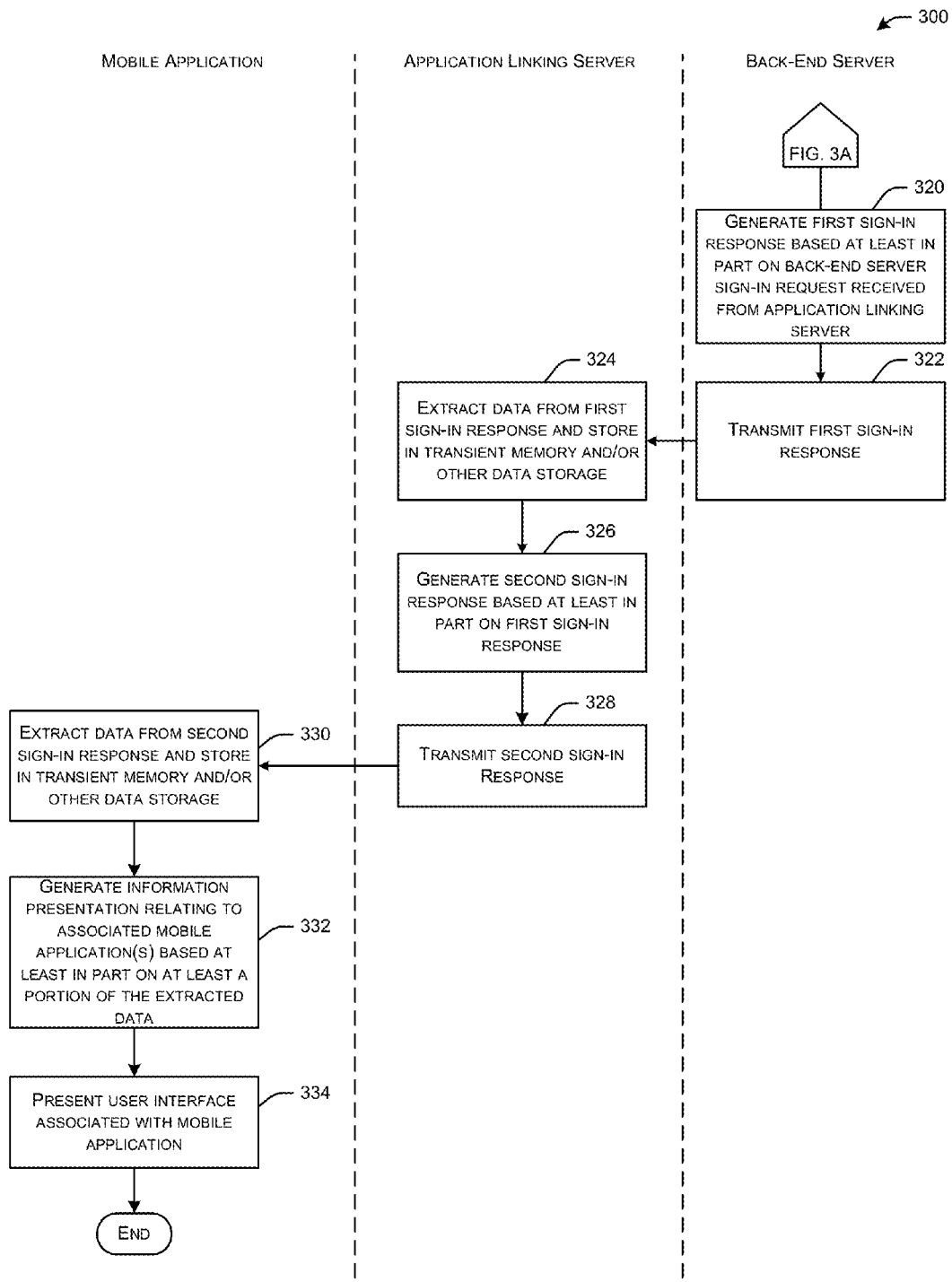

FIGS. 3A-3B depict an illustrative processing flow 300 for authenticating a user of a mobile application based on authentication credentials associated with the user and generating an interaction session between the user and a back-end server associated with the mobile application in accordance with one or more embodiments of the disclosure. One or more operations of the illustrative processing flow 300 may be performed, at least in part, upon execution of computer-executable instructions provided as part of the mobile application and/or the user authentication processing module 238.

At block 302, a mobile application—which may be for example any mobile application of the set of associated mobile applications 214(1)-214(S)—may receive an indication of launching of the mobile application. The indication may be received responsive to user input supplied to a mobile device to which the mobile application has been downloaded.

At block 304, a determination may be made as to whether the mobile application was launched from another mobile application within the set of associated mobile applications 214(1)-214(S). More specifically, a determination may be made at block 304 as to whether the mobile application was launched from a user interface that is associated with another mobile application of the set of associated mobile applications 214(1)-214(S) and which presents an information presentation relating to the set of associated mobile applications 214(1)-214(S). As a non-limiting example, the determination at block 304 may be made based at least in part on a parameter associated with the launching of the mobile application that indicates whether the mobile application was launched from within another associated mobile application. If it is determined that the mobile application was launched from within another associated mobile application, the illustrative processing flow 300 may proceed to block 608 of FIG. 6A where a determination may be made as to whether the launched mobile application is fully integrated for leveraging single sign-on processing. As will be described in more detail through reference to the illustrative processing flow of FIGS. 6A-6B and the illustrative processing flow of FIGS. 8A-8C either authentication processing to fully integrate the launched mobile application or single sign-on processing may be performed depending on the determination that is made at block 608 of FIG. 6A. In certain operating system environments, upon determining that the mobile application was launched from within another mobile application, it may be assumed that the launched mobile application is fully integrated for leveraging single sign-on processing.

Referring again to the determination at block 304, if it is determined that the mobile application was not launched from within another associated mobile application, the processing flow 300 may proceed to block 306. In certain embodiments, if it is determined that the mobile application was not launched from within another associated mobile application, it may be assumed that the mobile application was launched from a user interface of a user device that is independent of any of the associated mobile applications 214(1)-214(S) (e.g., a home screen of the user device or the like).

At block 306, a determination may be made as to whether active interaction session(s) exist for each back-end server 110/112 with which the mobile application is associated. If it is determined that a respective active interaction session exists for each associated back-end server 110/112, the processing flow 300 may proceed to block 308 and a user of a mobile device on which the mobile application is executing may be permitted to interact with the associated back-end server(s) 110/112 via the mobile application based at least in part on the active interaction session(s). The determination at block 306 may involve accessing an encrypted portion of the data storage 206 of the user device 104 that is accessible by the set of associated mobile applications 214(1)-214(S) to determine whether a respective back-end server session identifier 218 indicative of a respective interaction session with each of the back-end servers 110/112 associated with the mobile application is stored therein.

On the other hand, if it is determined at block 306, that an active interaction session does not exist for at least one back-end server 110/112 associated with the mobile application, the mobile application may prompt the user to enter authentication credentials at block 310 based on which the user may be authenticated with the associated back-end server 110/112. For ease of explanation, it will be assumed that the mobile application is associated with a single back-end server 110/112 for which no active interaction session exists. However, it should be appreciated that if the mobile application is associated with multiple back-end servers 110/112 for which no active interaction sessions exist, the user may potentially be prompted for a first set of authentication credentials for authenticating the user with a first associated back-end server 110/112, and upon establishment of an interaction session with the first associated back-end server 110/112, the mobile application may be able to leverage single sign-on processing to establish a respective interaction session with each additional associated back-end server 110/112.

Although the illustrative processing flow of FIGS. 3A-3B indicates that an affirmative determination at block 306 results in interaction between the mobile application and the associated back-end server(s) 110/112 based on existing interaction sessions, it should be appreciated that, in certain embodiments, an affirmative determination at block 306 may result in the mobile application prompting the user for one or more sets of authentication credentials for authenticating the user with respect to associated back-end server(s) 110/112. That is, if it is determined at block 304 that the mobile application was not launched from within another associated mobile application, the user may be prompted for authentication credentials regardless of whether active interaction session(s) exist with associated back-end server(s) in order to provide a consistent and uniform user experience for the user.

At block 312, the mobile application may generate a sign-in request that includes information identifying the back-end server 110/112 with which an interaction session is desired and the authentication credentials received from the user and based on which the back-end server may authenticate the user.

At block 314, the sign-in request generated by the mobile application may be appropriately formatted in accordance with formatting requirements of the application linking server 108 and may be transmitted from the mobile application to the application linking server 108 in accordance with one or more appropriate communication protocols.

At block 316, the application linking server 108 may generate a back-end server sign-in request based at least in part on the sign-in request received from the mobile application. As a non-limiting example, the application linking server 108 may include the authentication credentials received in the sign-in request from the mobile application in a back-end server sign-in request that is appropriately formatted according to formatting requirements associated with the back-end server 110/112. In certain embodiments, the network location of the back-end server 110/112 and communication protocol(s) for interacting with the back-end server 110/112 may be included in the sign-in request received from the mobile application. In other embodiments, the application linking server 108 may retrieve at least a portion of such information from one or more internal and/or external datastores.

At block 318, the application linking server 108 may transmit the back-end server sign-in request to the appropriate back-end server 110/112 in accordance with the identified communication protocol(s) and based at least in part on the identified network location of the back-end server 110/112.

Referring now to FIG. 3B, at block 320, upon successful authentication of the user by the back-end server 110/112 based at least in part on the authentication credentials included in the back-end server sign-in request received from the application linking server 108, the back-end server 110/112 may establish an interaction session that enables, at least in part, interaction between the user and the back-end server 110/112 and may generate a first sign-in response that includes an indication of the successful authentication of the user and a back-end server session identifier indicative of the established interaction session. The back-end server session identifier may have a time-to-live (TTL) value associated therewith that indicates a duration that the established interaction session with the back-end server will remain active. At block 322, the back-end server 110/112 may transmit the first sign-in response to the application linking server 108. While the remainder of the processing flow 300 assumes successful authentication by the back-end server 110/112 of the user based on the authentication credentials included in the back-end sign-in request, it should be appreciated that, in certain embodiments, authentication of the user may fail, in which case, the back-end server 110/112 may generate a response indicating failure of the authentication, which may be communicated, via the application linking server 108, to the mobile application and potentially presented to the user. Such a response indicating failure of the authentication may not include a back-end server session identifier.

At block 324, the application linking server 108 may extract various data from the first sign-in response received from the back-end server 110/112 and may store the extracted data in the memory 222 and/or in the data storage 224. The extracted data may include, for example, the back-end server session identifier indicative of the interaction session established with the back-end server 110/112, which may be stored in association with one or more of: i) an identifier associated with the back-end server 110/112, ii) an identifier associated with the user, iii) or an identifier associated with the mobile application. Storing the back-end server session identifier in this manner may allow the application linking server 108 to maintain knowledge of the interaction session established between the user and the back-end server 110/112 via the mobile application.

At block 326, the application linking server 108 may a generate a second sign-in response based at least in part on the first sign-in response received from the back-end server 110/112. The second sign-in response may include an indication of the successful authentication of the user by the back-end server 110/112, the back-end server session identifier indicative of the established interaction session with the back-end server 110/112, an application linking server (ALS) session identifier associated with an interaction session between the user and the application linking server 108, application association information relating to the set of associated mobile applications 214(1)-214(S), and optional initial data specific to the back-end server 110/112. As with the back-end server session identifier, the ALS session identifier may have a TTL value associated therewith that indicates a duration that the interaction session with the application linking server 108 will remain active. As previously noted, the application association information may include a respective identifier associated with each mobile application in the set of associated mobile applications 214(1)-214(S), respective back-end server identification information identifying a respective set of one or more back-end servers associated with each associated mobile application, respective metadata associated with each associated mobile application (including any of the types of metadata previously described), and so forth.

At block 328, the application linking server 108 may transmit the second sign-in response to the mobile application. At block 330, the mobile application may extract various data from the second sign-in response and may store the extracted data in the memory 204 of the user device 104 on which the mobile application is executing and/or in the data storage 206 of the user device 104. As a non-limiting example, the mobile application may extract the back-end server session identifier and the ALS server session identifier from the second sign-in response and may store the identifiers in the memory 204 and/or an encrypted portion of the data storage 206. Other mobile applications in the set of associated mobile applications 214(1)-214(S) may have shared access to the encrypted portion of the data storage 206 thereby allowing other associated applications to leverage the existing interaction sessions associated with the back-end server session identifier and the ALS session identifier. The data extracted by the mobile application from the second sign-in response may further include the application association information and/or other data that is specific to the back-end server 110/112.

At block 332, the mobile application may generate an information presentation relating to the set of associated mobile applications 214(1)-214(S) based at least in part on the application association information. In one or more embodiments of the disclosure, the information presentation may identify each associated mobile application other than the mobile application that is generating the information presentation. The information presentation may further include various status indicators that indicate statuses of various associated mobile applications. For example, the information presentation may include a first indicator that identifies those associated mobile applications identified in the information presentation that are downloaded and fully integrated for leveraging single sign-on processing. The information presentation may further include a second indicator that identifies those associated mobile applications identified in the information presentation that are not yet downloaded to the user device 104 but which are available for download. In certain operating system environments and/or implementations, the information presentation may further include a third indicator that identifies those associated mobile applications identified in the information presentation that are downloaded but not yet fully integrated for leveraging single sign-on processing. In various embodiments, information supplied by, for example, the O/S 212 of the user device 104 may identify an association between each mobile application in the set of associated mobile applications 214(1)-214(S) and a respective download or integration status.

At block 334, the mobile application may present a user interface associated with the mobile application. The user interface may display various content associated with the mobile application and may be a landing page, menu page, tab-bar interface, or the like. In certain embodiments, the first user interface presented by the mobile application may be a user interface for presenting the information presentation. It should be appreciated that any suitable user interface associated with the mobile application may be presented via the user device 104 to the user upon successful launching of the mobile application. Further, although generation of the information presentation is depicted in FIG. 3B as occurring within the processing flow after receiving the second sign-in response (which may comprise application association information), it should be appreciated that, in various embodiments, the information presentation may be dynamically generated according to a just-in-time mechanism upon navigation of the user to the user interface for presenting the information presentation from another user interface of the mobile application such as an initial user interface presented to the user.

Figure 4:
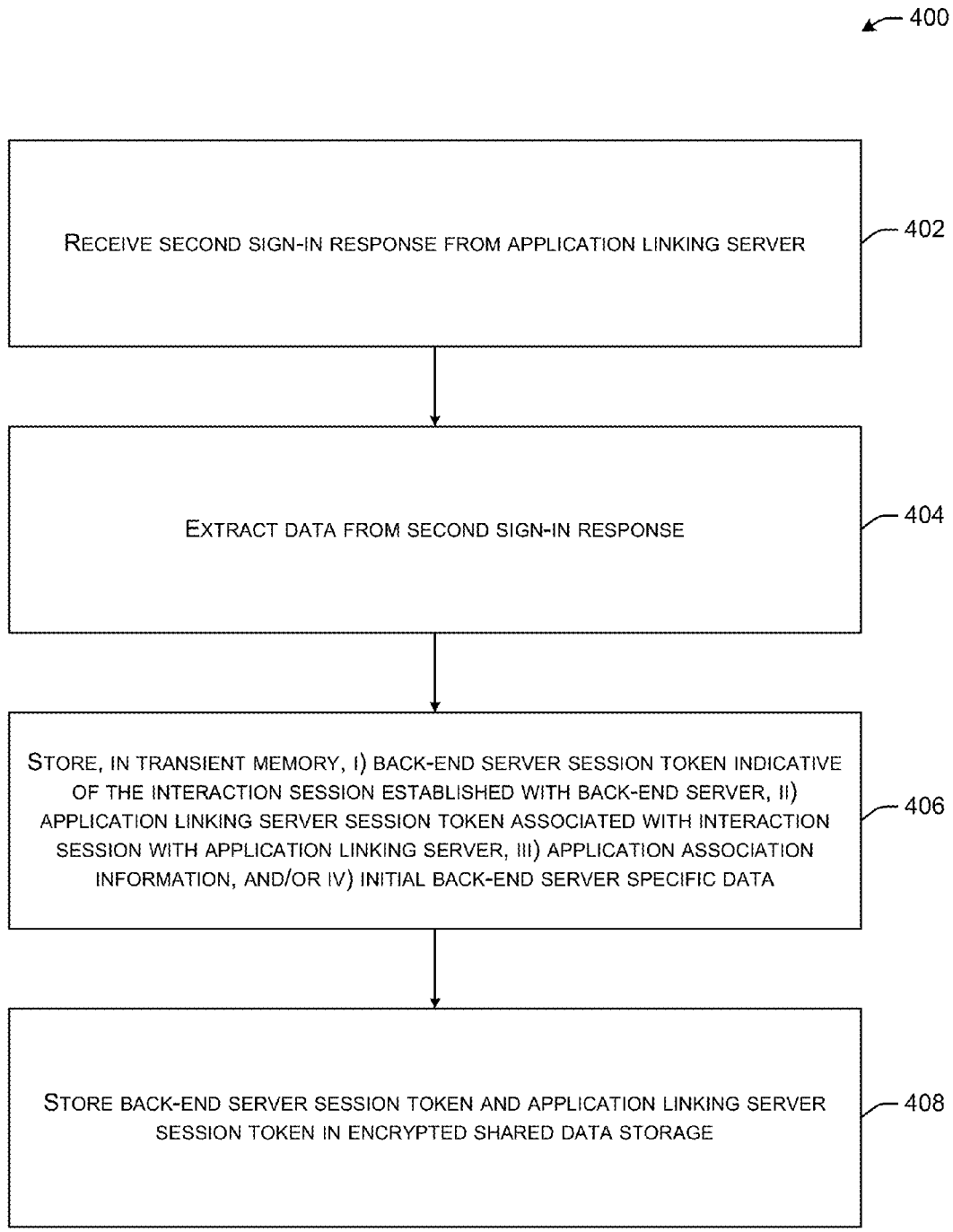
FIG. 4 depicts an illustrative processing flow for extracting and storing data received in a sign-in response from an application linking server in accordance with one or more embodiments of the disclosure.

FIG. 4 depicts an illustrative method 400 for extracting and storing data received in a sign-in response from an application linking server in accordance with one or more embodiments of the disclosure. One or more operations of the illustrative method 400 may be performed, at least in part, upon execution of computer-executable instructions provided as part of a mobile application of the set of associated mobile applications 214(1)-214(S). The operations of the illustrative method 400 may correspond to operations performed at block 330 of the illustrative processing flow 300.

At block 402, the second sign-in response may be received by the mobile application from the application linking server 108. At block 404, the mobile application may extract data from the second sign-in response. As previously noted, the extracted data may include the back-end server session identifier, the ALS session identifier, application association information, and optional data specific to the back-end server 110/112.

At block 406, the mobile application may store the back-end server session identifier indicative of the interaction session established with the back-end server, the ALS session identifier indicative of the interaction session with the application linking server 108, the application association information, and the optional data specific to the back-end server 110/112 in the memory 204 of the user device 104 on which the mobile application is executing.

At block 408, the mobile application may further store the back-end server session identifier and/or the ALS session identifier in persistent local data storage of the user device 104 (e.g., an encrypted portion of the data storage 206 of the user device 104). Other mobile applications of the set of associated mobile applications 214(1)-214(S) may have shared access to the encrypted portion of the data storage 206, and thus, may be able to retrieve the back-end server session identifier and the ALS session identifier therefrom and leverage the associated interaction sessions.

Figure 5:
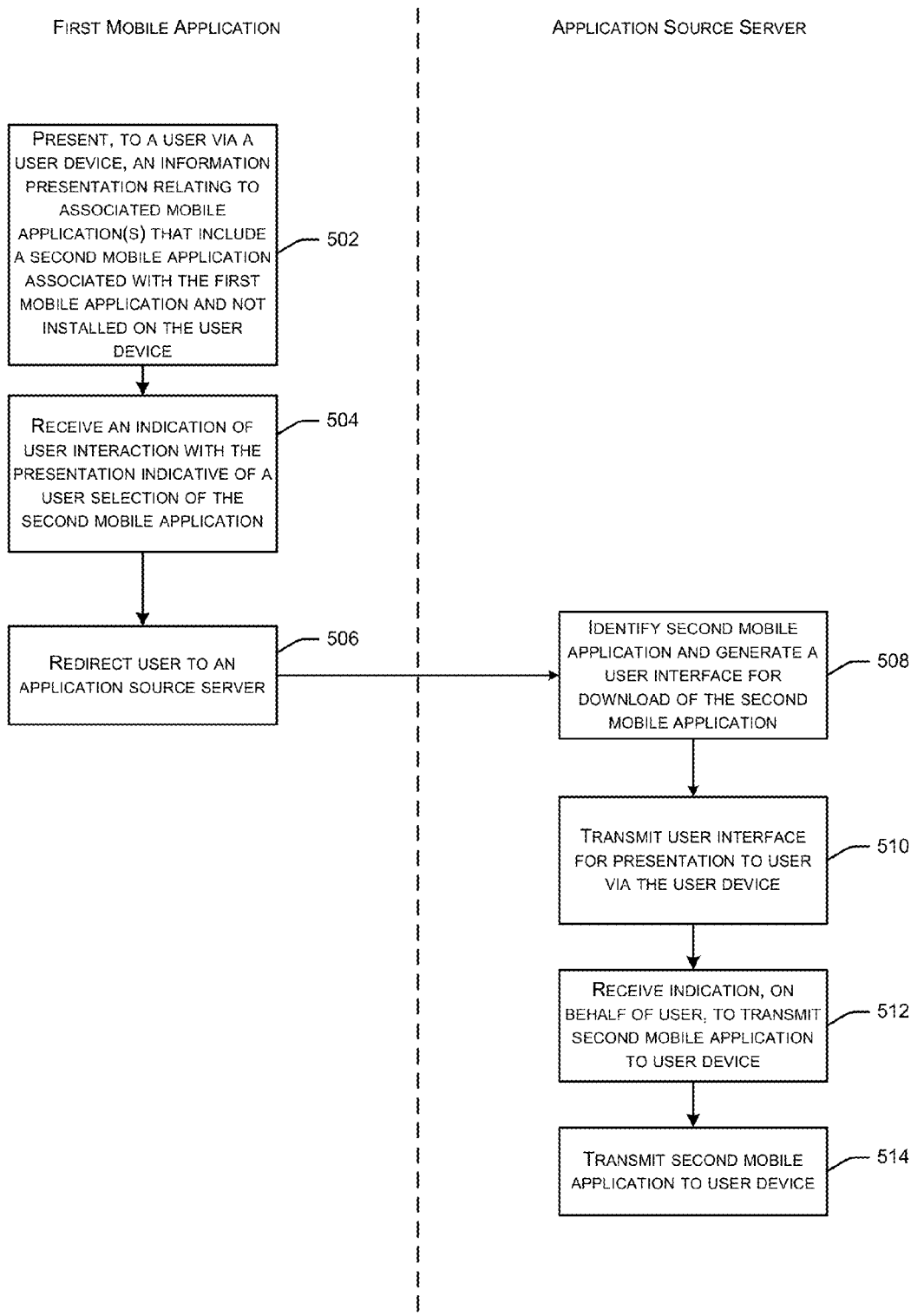
FIG. 5 depicts an illustrative processing flow for receiving an indication from a user to download a second mobile application via an information presentation of associated mobile applications presented by a first mobile application and transmitting the second mobile application to a user device in accordance with one or more embodiments of the disclosure.

FIG. 5 depicts an illustrative processing flow 500 for receiving an indication from a user to download a second mobile application via an information presentation relating to associated mobile applications presented by a first mobile application and transmitting the second mobile application to a user device in accordance with one or more embodiments of the disclosure. One or more operations of the illustrative processing flow 500 may be performed, at least part, upon execution of computer-executable instructions provided as part of the first mobile application presenting the information presentation and/or computer-executable instructions that control operations of the application source server 114.

At block 502, a first mobile application may present, to a user via a user device 104, an information presentation identifying the set of associated mobile applications 214(1)-

214(S). In certain embodiments, the information presentation may identify each associated mobile application in the set of associated mobile applications 214(1)-214(S) other than the first mobile application. Among those mobile applications identified in the information presentation may be a second mobile application that has not been downloaded to the user device 104, but which is available for download, and which is associated with the first mobile application (and each other mobile application identified in the information presentation). The first mobile application may be any mobile application within the set of associated mobile applications 214(1)-214(S) that has received the application association information from the application linking server 108 (via authentication processing or single sign-on processing performed with respect to the first mobile application) and which is therefore capable of generating the information presentation. As previously described, the information presentation may include various indicators that indicate a respective status, with respect to the user device 104, for each associated mobile application identified in the information presentation. For example, an indicator may identify each associated mobile application that has been downloaded and fully integrated so as to be able to leverage single sign-on processing as described herein. Further, another indicator may identify each associated mobile application that is available for download but has not yet been downloaded. In certain operating system environments, a third indicator may also be provided that identifies any associated mobile applications that have been downloaded but have not yet been fully integrated so as to be able to leverage single sign-on processing.

At block 504, the first mobile application may receive an indication of user interaction with the information presentation that is indicative of user selection of the second mobile application. Upon receipt of the indication of user interaction at block 504, the illustrative processing flow 500 may proceed to block 506 where the first mobile application may redirect the user to the application source server 114 in order to facilitate download of the second mobile application.

At block 508, the application source server 114 may receive the redirection of the user from the first mobile application, identify the second mobile application, and generate a user interface for downloading the second mobile application. At block 510, the application source server 114 may transmit the user interface to the user device 104 on which the first mobile application is executing such that the user interface may be rendered by the user device 104 for presentation to the user.

At block 512, the application source server 114 may receive an indication, on behalf of the user, to transmit the second mobile application to the user device 104. More specifically, the user device 104 may identify user interaction with the user interface that is indicative of a user's desire to download the second mobile application and may communicate the indication to the application source server 114. At block 514, upon receipt of the indication, the application source server 114 may transmit the second mobile application to the user device 104.

Upon download of the second mobile application to the user device 104, an operating system associated with the user device 104 may install the second mobile application. Upon installation, the second mobile application can be launched; however, depending on the particular operating system environment associated with the second mobile application, the second mobile application may not be fully integrated so as to be able to leverage single sign-on processing. However, if the second mobile application is fully integrated upon installation, single sign-on processing may be performed to establish interaction session with one or more back-end servers 110/112 with which the second mobile application is associated. Additional processing that may be performed for fully integrating the second mobile application will be described in greater detail through reference to FIGS. 6A-6B.

Figure 6A:
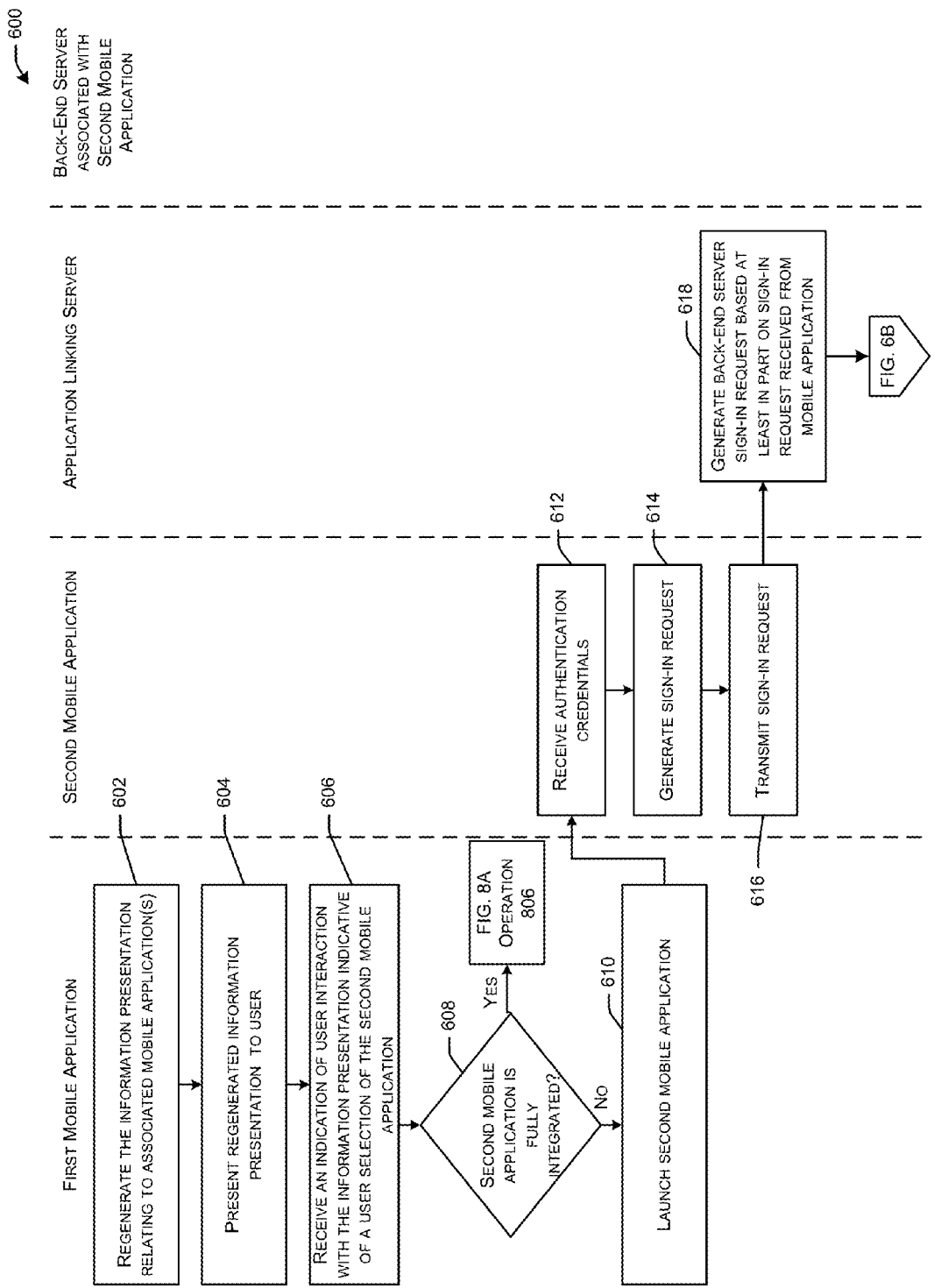
FIGS. 6A-6B depict an illustrative processing flow for fully integrating a downloaded mobile application so that the mobile application may leverage single sign-on processing in accordance with one or more embodiments of the disclosure.
Figure 6B:
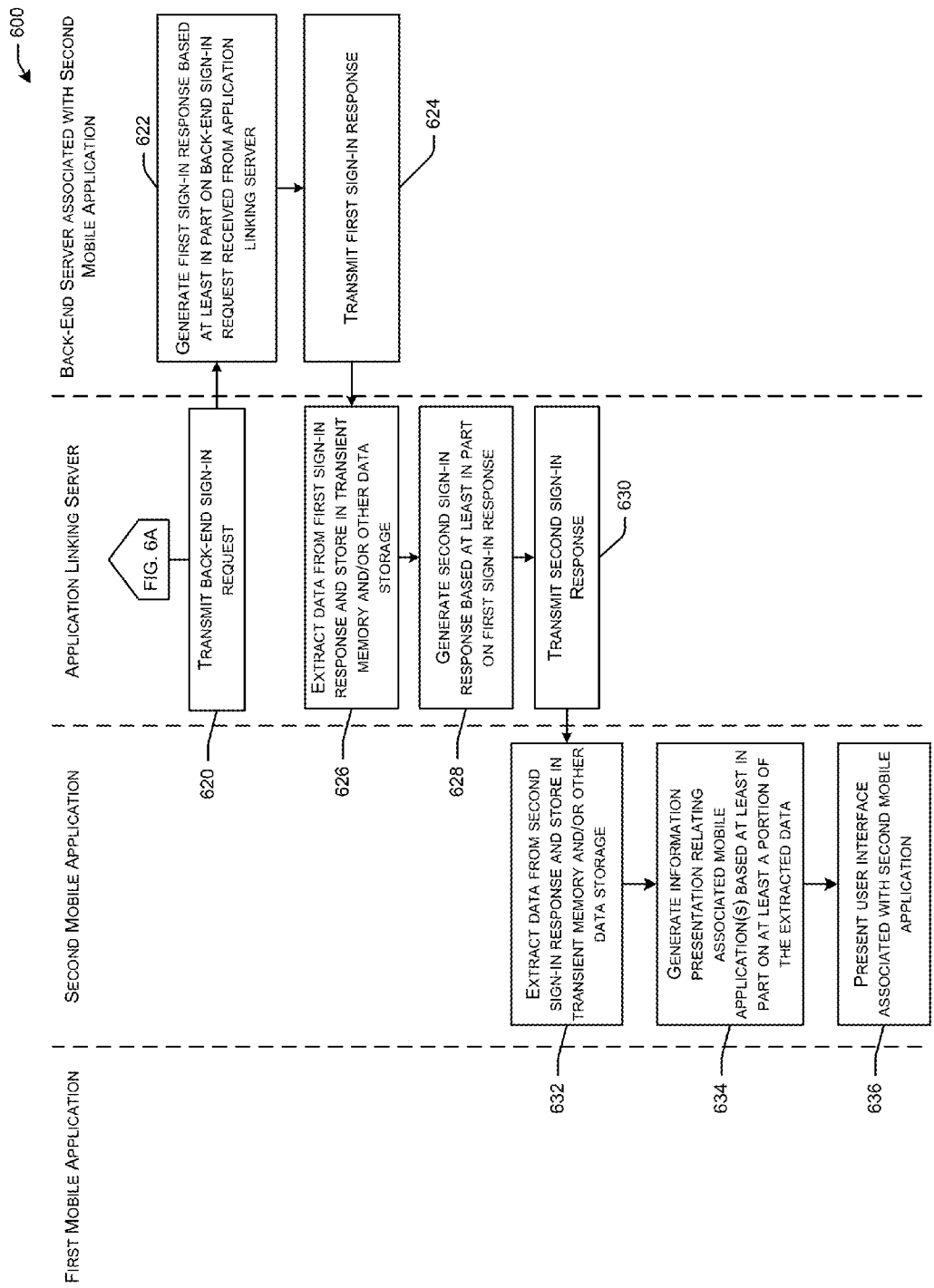

FIGS. 6A-6B depict an illustrative processing flow 600 for fully integrating a downloaded mobile application so that the mobile application may leverage single sign-on processing in accordance with one or more embodiments of the disclosure. One or more of the operations of the illustrative processing flow may be performed, at least in part, upon execution of computer-executable instructions provided as part of the first mobile application, the second mobile application, the application linking server 108, and/or a back-end server 110/112 associated with the second mobile application.

At block 602, the first mobile application may regenerate the information presentation relating to the set of associated mobile applications 214(1)-214(S). More specifically, after the second mobile application has been downloaded to the user device 104 and installed in accordance with the illustrative processing flow of FIG. 5, a user of the user device 104 may bring the first mobile application to the foreground and proceed to navigate to the user interface that presents the information presentation. Upon navigation to the user interface, the application association information may be reprocessed to dynamically regenerate the information presentation. As part of the regeneration of the information presentation, the second mobile application may become associated with a new status indicator. In particular, prior to download, the second mobile application may have been associated with an indicator identifying the second mobile application as available for download but not downloaded to the user device 104. Subsequent to the download and depending on the operating system environment of the user device 104, in the regenerated information presentation, the second mobile application may become associated with an indicator identifying the second mobile application as downloaded and fully integrated or an indicator identifying the second mobile application as downloaded by not yet fully integrated.

At block 604, the regenerated information presentation may be presented to the user via the user interface associated with the first mobile application. At block 606, the first mobile application may receive an indication of user interaction with the information presentation indicative of a user selection of the second mobile application. The user selection may correspond to a user's desire to launch the second mobile application from the information presentation presented by the first mobile application (e.g., from within the first mobile application).

At block 608, a determination may be made as to whether the second mobile application is fully integrated so as to be able to leverage single sign-on processing. In certain embodiments, the determination at block 608 may be made by accessing an encrypted portion of the data storage 206 of the user device 104 to identify whether a status flag or other identifier (e.g., a Boolean parameter) associated with the second mobile application indicates that that the second mobile application is fully integrated so as to be able to leverage single sign-on processing.

Figure 8A:
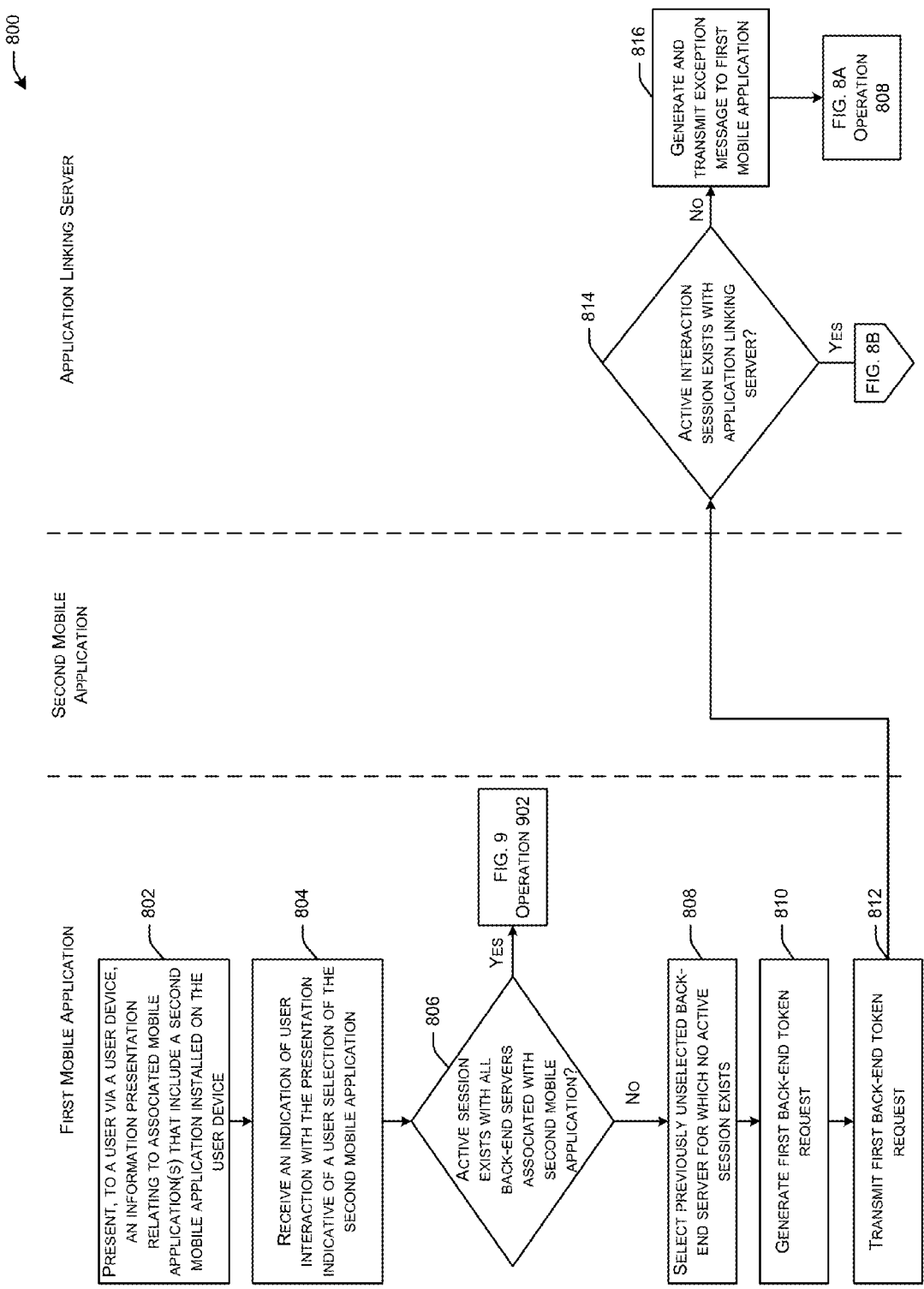
FIGS. 8A-8C depict an illustrative processing flow for performing single sign-on processing in accordance with one or more embodiments of the disclosure.

If it is determined at block 608 that the second mobile application is fully integrated, the illustrative processing flow 600 may proceed to operation 806 of the illustrative processing flow of FIG. 8A to initiate single sign-on processing. If, on the other hand, it is determined that the second mobile application is not fully integrated, the illustrative processing flow 600 may proceed to block 610 and the second mobile application may be launched without a parameter indicating that the second mobile application was launched from within the first mobile application (e.g., from the information presentation presented via a user interface of the first mobile application).

Upon launching, the second mobile application may be configured to determine that it was not launched from within another associated mobile application, and thus, may proceed to prompt the user for authentication credentials for authenticating the user with a back-end server 110/112 with which the second mobile application is associated in order to establish an interaction session between the user and the back-end server 110/112. The authenticating processing performed as part of the remainder of the processing flow 600 is similar to authentication processing described through reference to the illustrative processing flow 300 of FIGS. 3A-3B and assumes that an active interaction session does not exist for at least one back-end server 110/112 associated with the second mobile application.

At block 612, the second mobile application may prompt the user to enter authentication credentials based on which the user may be authenticated with the back-end server 110/112 associated with the second mobile application. For ease of explanation, it will be assumed that the second mobile application is associated with a single back-end server 110/112 for which no active interaction session exists. However, it should be appreciated that if the mobile application is associated with multiple back-end servers 110/112 for which no active interaction sessions exist, the user may potentially be prompted for a first set of authentication credentials for authenticating the user with a first associated back-end server 110/112, and upon establishment of an interaction session with the first associated back-end server 110/112, the mobile application may be able to leverage single sign-on processing to establish a respective interaction session with each additional associated back-end server 110/112. In certain other embodiments, the user may be prompted for multiple sets of authentication credentials for authenticating the user with respect to multiple associated back-end servers 110/112 if single sign-on processing fails. As will be described in more detail hereinafter, single single-on processing may fail for any number of reasons such as, for example, due to lack of a common identifier associated with the user and recognizable by multiple back-end servers 110/112.

At block 614, the second mobile application may generate a sign-in request that includes information identifying the back-end server 110/112 with which an interaction session is desired and the authentication credentials received from the user and based on which the back-end server may authenticate the user.

At block 616, the sign-in request generated by the second mobile application may be appropriately formatted in accordance with formatting requirements of the application linking server 108 and may be transmitted from the second mobile application to the application linking server 108 in accordance with one or more appropriate communication protocols.

At block 618, the application linking server 108 may generate a back-end server sign-in request based at least in part on the sign-in request received from the second mobile application. As a non-limiting example, the application linking server 108 may include the authentication credentials received in the sign-in request from the second mobile application in a back-end server sign-in request that is appropriately formatted according to formatting requirements associated with the back-end server 110/112. In certain embodiments, the network location of the back-end server 110/112 and communication protocol(s) for interacting with the back-end server 110/112 may be included in the sign-in request received from the second mobile application. In other embodiments, the application linking server 108 may retrieve at least a portion of such information from one or more internal and/or external datastores.

Referring now to FIG. 6B, at block 620, the application linking server 108 may transmit the back-end server sign-in request to the appropriate back-end server 110/112 in accordance with the identified communication protocol(s) and based at least in part on the identified network location of the back-end server 110/112.

At block 622, upon successful authentication of the user by the back-end server 110/112 based at least in part on the authentication credentials included in the back-end server sign-in request received from the application linking server 108, the back-end server 110/112 may establish an interaction session that enables, at least in part, interaction between the user and the back-end server 110/112 and may generate a first sign-in response that includes an indication of the successful authentication of the user and a back-end server session identifier indicative of the established interaction session. The back-end server session identifier may have a time-to-live (TTL) value associated therewith that indicates a duration that the established interaction session with the back-end server will remain active. At block 624, the back-end server 110/112 may transmit the first sign-in response to the application linking server 108. While the remainder of the processing flow 600 assumes successful authentication by the back-end server 110/112 of the user based on the authentication credentials included in the back-end sign-in request, it should be appreciated that, in certain embodiments, authentication of the user may fail, in which case, the back-end server 110/112 may generate a response indicating failure of the authentication, which may be communicated, via the application linking server 108, to the mobile application and potentially presented to the user. The response indicating failure of the authentication may not include a back-end server session identifier.

At block 626, the application linking server 108 may extract various data from the first sign-in response received from the back-end server 110/112 and may store the extracted data in the memory 222 and/or in the data storage 224. The extracted data may include, for example, the back-end server session identifier indicative of the interaction session established with the back-end server 110/112, which may be stored in association with one or more of: i) an identifier associated with the back-end server 110/112, ii) an identifier associated with the user, or iii) an identifier associated with the second mobile application. More specifically, the interaction session between the user of the user device 104 and the application linking server 108 may be extended or updated to further include the back-end server session identifier indicative of the interaction session established with the back-end server 110/112 with which the second mobile application is associated in addition to the back-end server session identifier associated with the back-end server 110/112 with which the first mobile application is associated. Storing the back-end server session identifier received at block 626 in this manner may allow the application linking server 108 to maintain knowledge of the interaction session established between the user and the back-end server 110/112 associated with the second mobile application.

At block 628, the application linking server 108 may a generate a second sign-in response based at least in part on the first sign-in response received from the back-end server 110/112. The second sign-in response may include an indication of the successful authentication of the user by the back-end server 110/112 with which the second mobile application is associated, the back-end server session identifier indicative of the established interaction session, an updated application linking server (ALS) session identifier associated with an interaction session between the user and the application linking server 108, application association information relating to the set of associated mobile applications 214(1)-214(S), and optional initial data specific to the back-end server 110/112 with which the second mobile application is associated. The updated ALS session identifier may have an updated TTL value associated therewith. In certain embodiments, the updated ALS session identifier may be a newly generated identifier with a corresponding TTL value associated therewith.

At block 630, the application linking server 108 may transmit the second sign-in response to the second mobile application. At block 632, the second mobile application may extract various data from the second sign-in response and may store the extracted data in the memory 204 of the user device 104 on which the second mobile application is executing and/or in the data storage 206 of the user device 104. As a non-limiting example, the second mobile application may extract, from the second sign-in response, the back-end server session identifier indicative of the interaction session established with the back-end server 110/112 with which the second mobile application is associated and may store the back-end server session identifier in the memory 204 and/or an encrypted portion of the data storage 206. Other mobile applications in the set of associated mobile applications 214(1)-214(S) may have shared access to the encrypted portion of the data storage 206 thereby allowing other associated applications to leverage the interaction session associated with the back-end server session identifier. Further, the second mobile application may store or update (e.g., overwrite) the ALS session identifier stored in the memory 204 and/or the data storage 206 based at least in part on the updated ALS session identifier received from the application linking server 108. In certain embodiments, the updated ALS session identifier may be stored in a portion of memory 204 allocated to the second mobile application without overwriting the previous ALS session identifier stored in the memory 204. The data extracted by the second mobile application from the second sign-in response may further include the application association information and/or other data that is specific to the back-end server 110/112 with which the second mobile application is associated. In addition to the extraction and storage of various data included in the second sign-in response, the status flag or identifier that is stored in the data storage 206 and which identifies the integration status of the second mobile application may be updated to reflect that the second mobile application is now fully integrated so as to be able to leverage single sign-on processing. Other mobile applications in the set of associated mobile applications 214(1)-214(S) may have shared access to the encrypted portion of the data storage 206, thereby allowing these applications to display the current integration status of the second mobile application in their own information presentations.

At block 634, the second mobile application may generate an information presentation relating to the set of associated mobile applications 214(1)-214(S) based at least in part on the application association information. In one or more embodiments of the disclosure, the information presentation may identify each associated mobile application other than the second mobile application. As described previously, the information presentation may further include various indicators that indicate statuses of various associated mobile applications identified in the information presentation. The current mobile application may be excluded from the information presentation. In certain embodiments, the information presentation may be generated when the user navigates to a user interface for presenting the information presentation, rather than immediately after processing the second sign-in response.

At block 636, the second mobile application may be launched and may present a user interface associated with the second mobile application. The user interface may display various content associated with the second mobile application and may be a landing page, menu page, tab-bar interface, or the like. In certain other embodiments, the first user interface presented by the second mobile application may be a user interface for presenting the information presentation. It should be appreciated that any suitable user interface associated with the mobile application may be presented via the user device 104 to the user upon successful launching of the second mobile application. Further, although generation of the information presentation is depicted in FIG. 6B as occurring prior to presentation of the initial user interface associated with the second mobile application, it should be appreciated that, in various embodiments, the information presentation may be dynamically generated upon navigation of the user to the user interface for presenting the information presentation from the initial user interface presented to the user.

At this stage in the processing, both the first mobile application and the second mobile application are executing on the user device 104 and the user is able to navigate between the applications and within each application (e.g., from the user interface presenting the information presentation to one or more other user interfaces of the application). Further, both the first mobile application and the second mobile application are configured to access the encrypted portion of the data storage 206 storing the ALS session identifier and the back-end server session identifiers associated with the interaction sessions established with the respective back-end servers 110/112 with which the first and second mobile applications are associated. If the user were to navigate to the user interface for presenting the information presentation associated with the first mobile application, the information presentation would be dynamically regenerated and the second mobile application would now be associated with an indicator that identifies the second mobile application as downloaded and fully integrated. The first mobile application may identify the second mobile application as downloaded and fully integrated for the purposes of dynamically regenerating the information presentation based at least in part on the updated status flag or identifier associated with the second mobile application and stored in the encrypted portion of the data storage 206.

Figure 7:
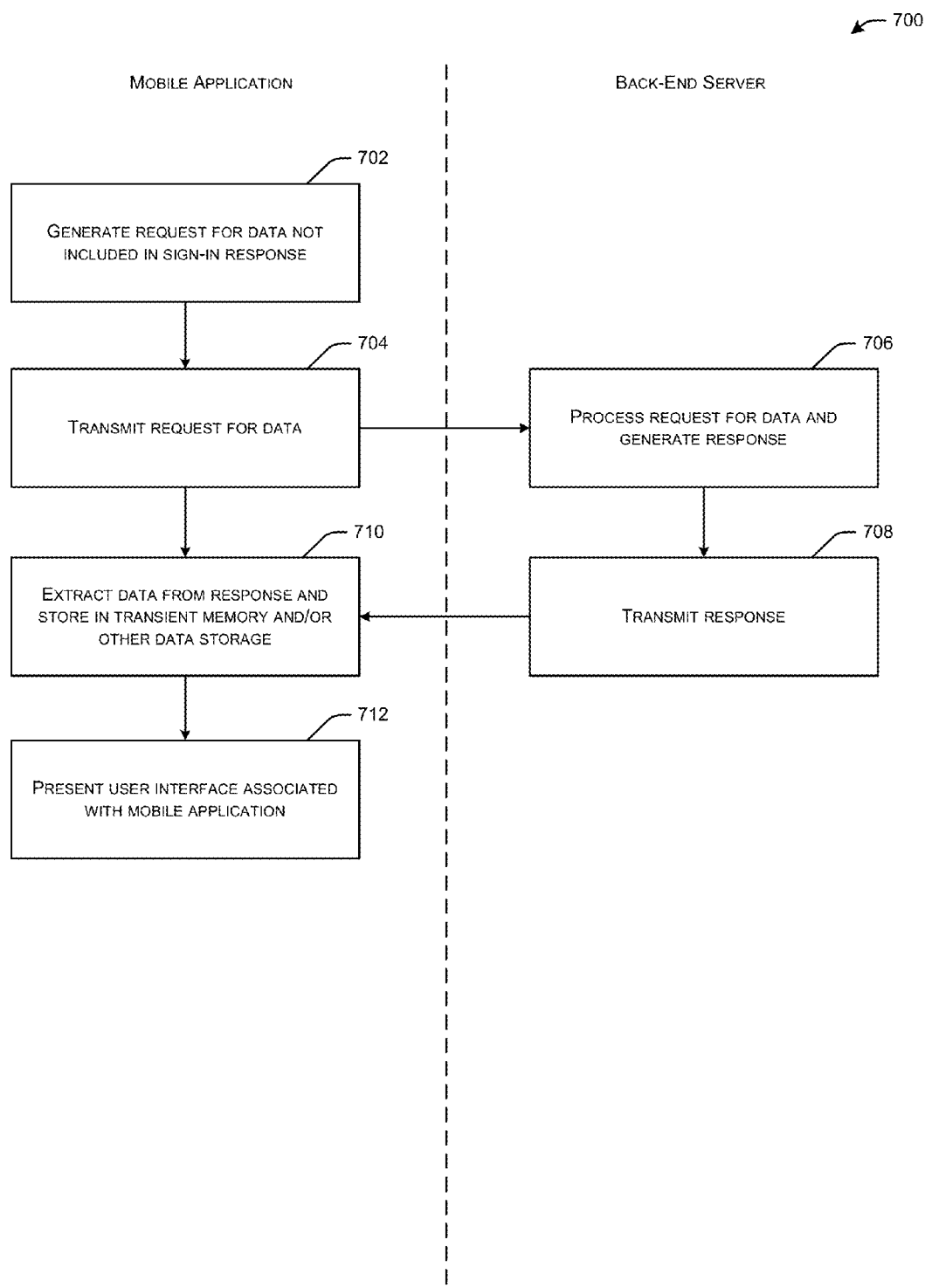
FIG. 7 depicts an illustrative processing flow for receiving, by a mobile application, information from a back-end server in response to a request for the information and storing at least a portion of the information in accordance with one or more embodiments of the disclosure.

FIG. 7 depicts an illustrative processing flow 700 for receiving, by a mobile application, information from a back-end server in response to a request for the information and storing at least a portion of the information in accordance with one or more embodiments of the disclosure. The illustrative processing flow 700 may be performed subsequent to receipt of a back-end server session identifier by a mobile application, either as part of authentication processing performed based on authentication credentials received from a user or as part of single sign-on processing. For example, the illustrative processing flow 700 may be performed in conjunction with the illustrative processing flow 300, the illustrative processing flow 600, and/or the illustrative processing flow 800 of FIGS. 8A-8C.

At block 702, a mobile application (e.g., any of the associated mobile applications in the set of associated mobile applications 214(1)-214(S)) may generate a request for initial data not provided in the second sign-in response received from the application linking server 108. The request may be generated for a variety of reasons such as, for example, because additional data is required by the mobile application beyond that which was provided in the second sign-in response received from the application linking server 108 or because the back-end server 110/112 did not provide any initial back-end specific data to the application linking server 108 for inclusion in the second sign-in response.

At block 704, the mobile application may transmit the generated request to the appropriate back-end server 110/112. As part of the illustrative processing flow 700, the mobile application may interact with the back-end server 110/112 without the intervention of the application linking server 108 based at least in part on the back-end server session identifier received in the second sign-in response from the application linking server 108.

At block 706, the back-end server 110/112 may process the request for data and may generate a response that includes the requested data. In certain embodiments, the nature of the information included in the response may be based at least in part on the user associated with the mobile application. At block 708, the back-end server 110/112 may transmit the response to the mobile application.

At block 710, the mobile application may process the response received from the back-end server 110/112, extracting at least a portion of the data included in the response and storing the extracted data in the memory 204 of the user device and/or the data storage 206. In various embodiments, each time the mobile application interacts with the back-end server, the associated back-end server session identifier stored in the memory 204 and/or the encrypted portion of the data storage 206 may be updated (e.g., a TTL value associated with the identifier may be updated).

Figure 8B:
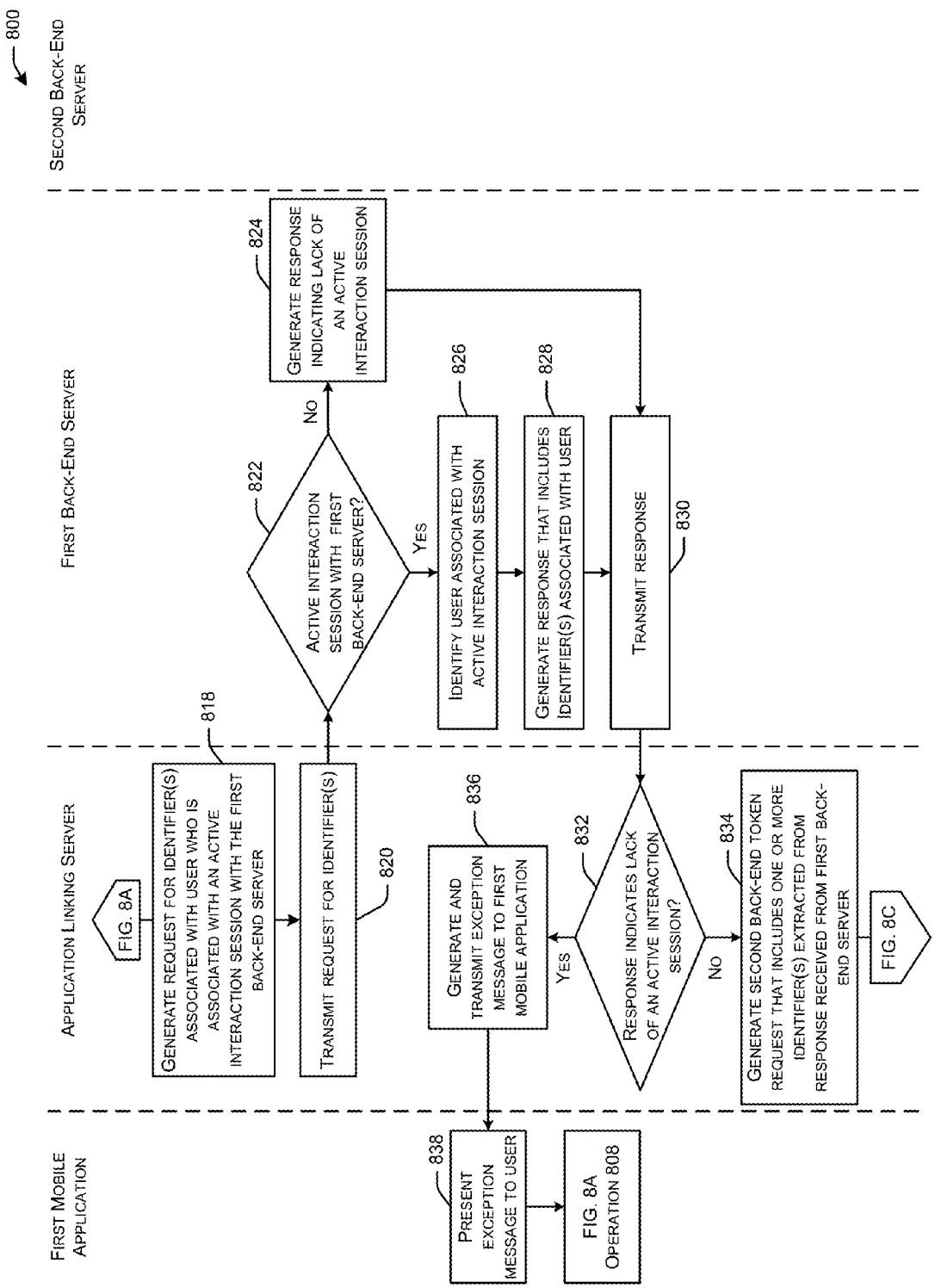
Figure 8C:
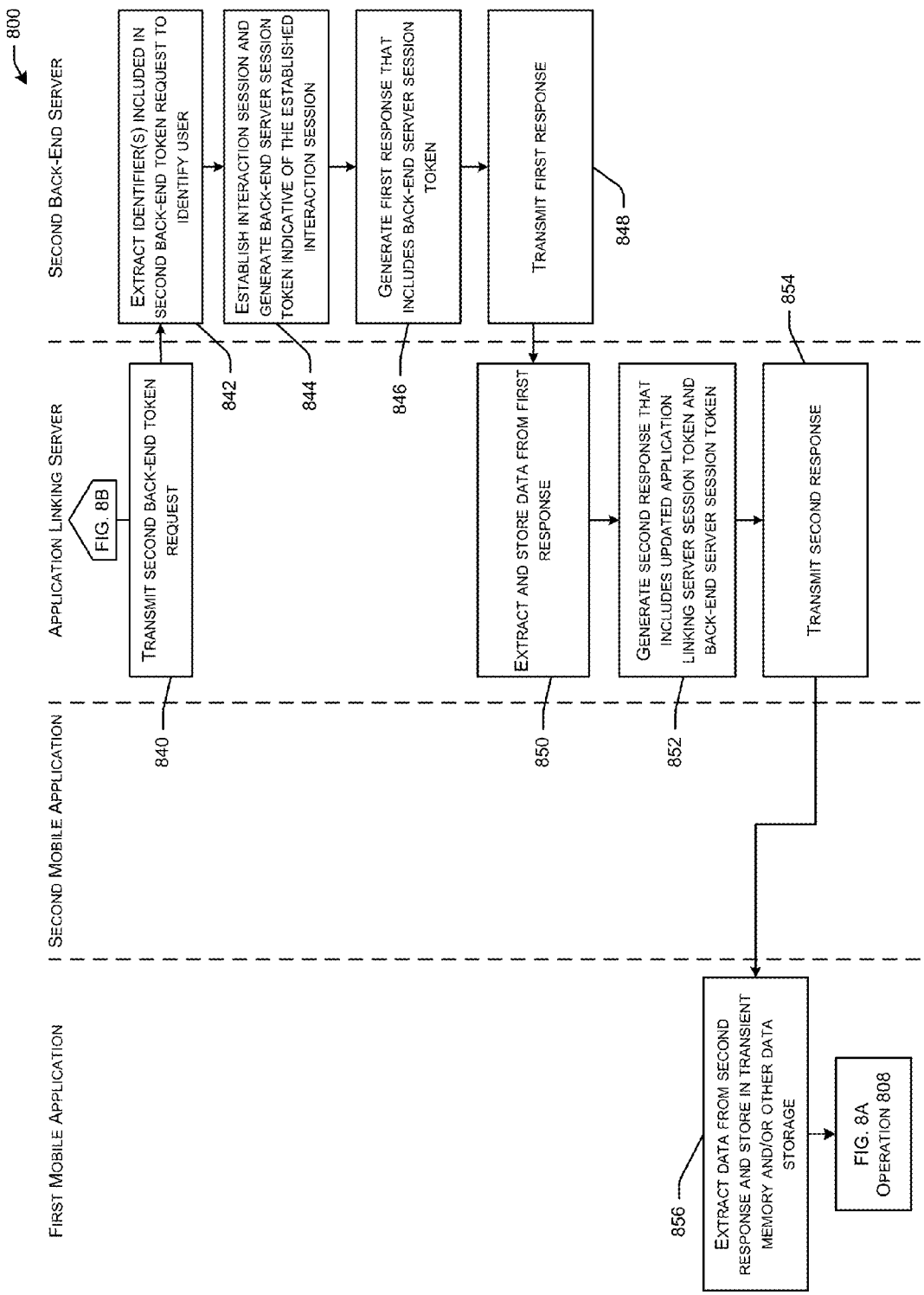

FIGS. 8A-8C depict an illustrative processing flow 800 for performing single sign-on processing in accordance with one or more embodiments of the disclosure. The single sign-on processing may be performed, for example, upon launching of a second mobile application from an information presentation presented via a user interface associated with a first mobile application based at least in part on an existing interaction session with the application linking server 108 and existing interaction sessions with one or more back-end servers 110/112 associated with the first mobile application. One or more of the operations of the processing flow 800 may be performed upon execution of computer-executable instructions provided as part of the first mobile application and/or the single sign-on processing module 236.

At block 802, an information presentation identifying the set of associated mobile applications 214(1)-214(S) may be presented via a user interface of a first mobile application. As previously noted, the information presentation may identify each associated mobile application other than the first mobile application that is presenting the information presentation.

At block 804, the first mobile application may receive an indication of user interaction with the information presentation that is indicative of a user selection of a second mobile application among the associated mobile applications identified in the information presentation. The illustrative single sign-on processing 800 depicted in FIGS. 8A-8C assumes that the second mobile application has been downloaded to the user device 104 on which the mobile applications are executing and that the second mobile application is fully integrated. In the event that the second mobile application is not fully integrated, the illustrative processing 600 for fully integrating the second mobile application may be performed.

At block 806, a determination may be made as to whether an active interaction session exists with all back-end server(s) 110/112 with which the second mobile application is associated. As previously noted, any of the associated mobile applications may be associated with multiple back-end servers 110/112 that may each unambiguously identify the user based on potentially different identifiers or authentication credentials. If it is determined at block 806 that a respective active interaction session exists with each back-end server 110/112 with which the second mobile application is associated, the illustrative processing flow 800 may proceed to block 902 of FIG. 9 to initiate processing for receipt of application association information by the second mobile application.

If, on the other hand, it is determined at block 806 that an active interaction session does not exist with at least one back-end server 110/112 associated with the second mobile application, the illustrative processing flow 800 may proceed to block 808. The operations of blocks 808-856 may represent iterative processing that may be performed in connection with each back-end server 110/112 associated with the second mobile application and for which an active interaction session does not exist.

At block 808, a previously unselected back-end server 110/112 associated with the second mobile application and for which no active interaction session exists may be identified or selected. At block 810, the first mobile application may generate a first back-end session identifier request for a second back-end server session identifier indicative of establishment of an interaction session with the selected second back-end server 110/112 (which may be referred to hereinafter as the second back-end server 110/112). The first back-end session identifier request may include various information including, but not limited to, an identifier associated with a first back-end server 110/112 with which the first mobile application is associated, a first back-end server session identifier associated with an existing interaction session with the first back-end server 110/112, an identifier associated with the second back-end server 110/112, an application linking server (ALS) session identifier associated with an existing interaction session with the application linking server 108, and so forth. At block 812, the first mobile application may transmit the first back-end session identifier request to the application linking server 108.

Upon receipt of the first back-end session identifier request from the first mobile application, the application linking server 108 may, at block 814, make a determination as to whether an active interaction session exists between the first mobile application and the application linking server 108. In certain scenarios, an active interaction session between the first mobile application and the application linking server 108 may not exist due to recent expiration of the interaction session. If it is determined at block 814, that an active interaction session between the first mobile application and the application linking server 108 does not exist, the processing flow 800 may proceed to block 816 where the application linking server 108 may generate and transmit, to the first mobile application, an exception message indicating that the single sign-on processing has failed. Upon receipt of the exception message, the first mobile application may again make a determination at block 806 as to whether an active interaction session exists for each back-end server 110/112 associated with the second mobile application. However, it should be appreciated that in certain embodiments the processing flow 800 may not proceed from block 816 to block 808, but rather authentication processing based on authentication credentials received from the user may be performed in order to authenticate the user with the back-end server(s) with which the second mobile application is associated.

If, on the other hand, the validation processing performed by the application linking server at block 814 is successful, the processing flow 800 may proceed to block 818 wherein the application linking server 108 may generate a request for identifiers associated with the user. In accordance with one or more embodiments of the disclosure, each back-end server 110/112 may be configured to store one or more identifiers associated with a user who is associated with an active interaction session with the back-end server 110/112. The identifiers may include, but are not limited to, a social security number, a tax identification number, one or more demand deposit account (DDA) numbers each potentially including a routing number and an account number, one or more debit card numbers, one or more credit card numbers, one or more electronic mail addresses, one or more telephone numbers, one or more social networking identifiers, various other financial account or entity identifiers, and so forth. In certain embodiments, a respective more than one instance of one or more identifiers associated with the user may be stored by a back-end server 110/112 (e.g., multiple electronic mail addresses). Further, each back-end server 110/112 may be configure to utilize certain identifier(s) to unambiguously identify a user and establish an interaction session between the user and the back-end server 110/112 without requiring authentication credentials associated with the user.

The application linking server 108 may store in one or more internal and/or external datastores respective information associated with each back-end server 110/112 that may include an identifier associated with the back-end server 110/112, identifier(s) that the back-end server stores and is capable of providing to the application linking server 108, identifier(s) that the back-end server 110/112 is configured to accept as part of single sign-on processing, and so forth.

The application linking server 108 may utilize the respective information associated with the first back-end server 110/112 and the respective information associated with the second back-end server 110/112 to generate the identifiers request at block 818. The identifiers request may include a request for all identifiers associated with the user that the first back-end server 110/112 is capable of providing, or in other embodiments, may be a request for a subset of identifiers (e.g., those identifiers that the first back-end server 110/112 is able to provide and which the second back-end server 110/112 is able to use to identify the user).

As previously noted, the first back-end server 110/112 may store and be able to provide to the application linking server 108 various illustrative identifiers associated with a user who, in turn, is associated with an active interaction session with the first back-end server 110/112. As a non-limiting example, the first back-end server 110/112 may be able to provide illustrative identifiers including a social security number, electronic mail address(es), and telephone number(s). As a further non-limiting example, the application linking server 108 may have knowledge based on the respective information associated with the second back-end server 110/112 that the application linking server 108 has access to, that the second back-end server 110/112 is able to accept DDA(s), credit card number(s), debit card number(s), electronic mail address(es), and telephone number(s). In the above illustrative example, the application linking server 108 may generate an identifiers request for all of the identifiers that the first back-end server 110/112 is able to provide (e.g., the social security number, electronic mail address(es), and telephone number(s)). In other embodiments, the application linking server 108 may scope the identifiers request to request only those identifiers that the first back-end server 110/112 is able to provide and which the second back-end server 110/112 accepts for identifying the user without requiring authentication credentials (e.g., electronic mail address(es) and telephone number(s)).

It should be appreciated that in certain embodiments, the intersection between the set of identifiers that the first back-end server 110/112 is able to provide and the set of identifiers that the second back-end server 110/112 is configured to accept may be null. That is, there may be no identifiers in common between those the first back-end server 110/112 can provide and those that the second back-end server 110/112 is able to utilize to identify the user. In such scenarios, single sign-on processing may not be able to be performed and the launched mobile application (e.g., the second mobile application) may have to obtain authentication credentials from the user in order for explicit identification of the user by the appropriate back-end server (e.g., the second back-end server 110/112).

In addition to an identification of one or more identifiers associated with the user, the identifiers request may further include the back-end server session identifier indicative of an interaction session with the first back-end server 110/112. The application linking server 108 may transmit the identifiers request at block 820. The first back-end server 110/112 may receive the identifiers request and initiate various validation processing. At block 822, the first back-end server 110/112 may make a determination as to whether an active interaction session exists that corresponds to the back-end server session identifier included in the received request. Further, although not depicted in FIGS. 8A-8C, the first back-end server 110/112 may additionally make a determination as to whether the identifiers request is received from a trusted party. If it is determined that the request is not received from a trusted party, an exception message may be generated and transmitted to the application linking server 108 for transmission to the first mobile application, and potential presentation to the user.

If it is determined that a corresponding active interaction session does not exist, the illustrative processing flow 800 may proceed to block 824 where the first back-end server may generate a response indicating lack of an active interaction session. On the other hand, if a determination is made at block 822 that an active interaction session exists that is associated with the first back-end server and that corresponds to the back-end server session identifier included in the request received from the application linking server 108, the first back-end server 110/112 may proceed to identify the user associated with the active interaction session at block

826. At block 828, the first back-end server 110/112 may determine one or more identifiers associated with the user and generate a response that includes the one or more identifiers. The identifier(s) included in the response may be appropriately constrained based on the identifier(s) requested in the identifiers request. At block 830, the first back-end server 110/112 may transmit the response to the application linking server 108. The response transmitted at block 830 may be a response that includes one or more identifiers associated with the user (based on successful authentication of the user by the first back-end server 110/112) or may be the response generated at block 824 that indicates lack of an active interaction session.

At block 832, the application linking server 108 may make a determination as to whether an active interaction session was confirmed by the first back-end server 110/112. More specifically, the determination at block 832 may be a determination as to whether the response received from the first back-end server 110/112 includes the requested identifiers or includes an indication of lack of an active interactive session. If it is determined that an active interaction session was not successfully confirmed, and thus, that the response does not include the requested identifiers, the application linking server 108 may generate and transmit, to the first mobile application, an exception message indicating failure of the single sign-on processing. Upon receipt of the exception message, the first mobile application 838 may optionally present the exception message to the user at block 838. From block 838, the illustrative processing flow 800 may again proceed to block 808 where a previously unselected back-end server with which the second mobile is associated may be selected for initiation of single sign-on processing. It should be appreciated that in certain embodiments the processing flow 800 may not proceed from block 838 to block 808, but rather authentication processing based on authentication credentials received from the user may be performed in order to authenticate the user with the back-end server(s) with which the second mobile application is associated.

If a determination is made at block 832 that an active interaction session was confirmed by the first back-end server 110/112 and that the response received from the first back-end server 110/112 includes one or more requested identifiers, the processing flow 800 may proceed to block 834 where the application linking server 108 may generate a second back-end session identifier request that includes one or more identifiers extracted from the response received from the first back-end server 110/112. In certain embodiments, the application linking server 108 may optionally filter the identifier(s) included in the received response to identify those that are usable by the second back-end server 110/112 to identify the user. In other embodiments, the response may have already been constrained to include only those identifier(s) that are usable by the second back-end server 110/112, in which case, all identifier(s) included in the response may be included in the second back-end session identifier request. It should be noted that the terms "first back-end session identifier request" and "second back-end session identifier request" are used herein in the context of the illustrative processing flow 800 of FIGS. 8A-8C to distinguish the request received by the application linking server 108 from the first mobile application from the request generated by the application linking server 108 and transmitted to the second back-end server 110/112.

Referring now to FIG. 8C, at block 840, the application linking server 108 may transmit the generated second back-end session identifier request to the second back-end server 110/112. At block 842, the second back-end server 110/112 may receive the request and optionally verify that the request is received from a trusted party. Further, at block 842, the second back-end server 110/112 may determine the identifier(s) included in the second back-end session identifier request and perform processing to identify the user associated with the identifier(s). In certain embodiments, the second back-end server 110/112 may serially select the identifier(s) from the request to identify the user based at least in part on one or more prioritization criteria associated with the second back-end server 110/112. Further, in certain embodiments, the application linking server 108 may utilize one or more prioritization criteria to prioritize the identifiers received in the response from the first back-end server 110/112 and may serially communicate the identifiers to the second back-end server 110/112 in accordance with the determined priority until the user is successfully identified by the second back-end server 110/112 and an associated interaction session is established. The one or more prioritization criteria may include, for example, a likelihood of success in identifying the user and establishing an interaction session with the second back-end server.

Upon identification of the user, the second back-end server 110/112 may establish an interaction session between the user and the second back-end server 110/112 and may generate a back-end server session identifier indicative of the established interaction session. At block 846, the second back-end server 110/112 may generate a first response that includes the second back-end server session identifier indicative of the interaction session established with the second back-end server 110/112. In certain embodiments, the first response may optionally include initial data to be provided to the second mobile application. Any such initial data included in the first response is ultimately transmitted to the first mobile application, and thus, may need to be provided to the second mobile application as a parameter associated with launching of the second mobile application or via the encrypted portion of the data storage 206 of the user device 104.

At block 848, the second back-end server 110/112 may transmit the generated first response to the application linking server 108. At block 850, the application linking server 108 may process the first response received from the second back-end server 110/112 to extract various data included therein and store the extracted data in the memory 222 and/or in the data storage 224. The extracted data may include, for example, the back-end server session identifier indicative of the interaction session established with the second back-end server 110/112, which may be stored in association with at least one of: i) an identifier associated with the second back-end server 110/112, ii) an identifier associated with the user, or iii) an identifier associated with the second mobile application. Storing the second back-end server session identifier in this manner may allow the application linking server 108 to maintain knowledge of the interaction session established between the user and the second back-end server 110/112.

At block 852, the application linking server 108 may generate a second response that may include an indication of successful single sign-on processing at the second back-end server 110/112, the second back-end server session identifier indicative of the interaction session established with the second back-end server 110/112, an updated ALS session identifier, and optionally initial back-end specific data received from the second back-end server 110/112. At block 854, the application linking server 108 may transmit the second response to the first mobile application. It should be noted that the terms "first response" and "second response" are used herein in the context of the illustrative processing flow 800 of FIGS. 8A-8C to distinguish the response including the second back-end server session identifier received by the application linking server 108 from the second back-end server 110/112 from the response including the second back-end server session identifier that is generated by the application linking server 108 and transmitted to the first mobile application.

At block 856, the first mobile application may extract and store various data included in the second response received from the application linking server 108. More specifically, the first mobile application may store the second back-end server session identifier indicative of the interaction session established with the second back-end server 110/112 as well as the updated ALS session identifier in the memory 204 of the user device 104. In addition, the first application may store the second back-end server session identifier in the encrypted portion of the data storage 206 of the user device 104. Further, the ALS session identifier stored in the encrypted portion of the data storage 206 may be overwritten with the updated ALS session identifier.

From block 856, the illustrative processing flow 800 may proceed once again to block 806 where a determination may again be made as to whether an active interaction session exists with each back-end server with which the second mobile application is associated. If it is determined that an active interaction session does not exist for at least one back-end server associated with the second mobile application, the processing flow may again proceed to block 808 and a previously unselected back-end server for which no active interaction session exists may be selected for initiation of single sign-on processing. If on the other hand, an active interaction session exists for each back-end server associated with the second mobile application, the second mobile application may be launched in accordance with the illustrative processing flow depicted in FIG. 9.

While the single sign-on processing described above has been described in the context in which the application linking server 108 transmits the identifiers request to the first back-end server associated with the first mobile application, it should be appreciated that in those embodiments in which the first mobile application is associated with multiple back-end servers, identifiers associated with the user may be requested from any back-end server with which an interaction session has already been established. Further, in certain embodiments, back-end servers for which interaction sessions exist may be serially accessed until identifier(s) are provided based on which the second back-end server 110/112 is able to identify the user.

FIG. 9 depicts an illustrative processing flow 900 for launching a second mobile application from a first mobile application and receiving application association information for generating an information presentation relating to associated mobile applications in accordance with one or more embodiments of the disclosure. One or more operations of the processing flow 900 may be performed upon execution of computer-executable instructions provided as part of the first mobile application, the second mobile application, and/or one or more program modules of the application linking server 108.

At block 902, the second application may be launched with a parameter indicating that the second mobile application was launched from within the first mobile application. In certain embodiments, the second mobile application may be launched from a user interface associated with the first mobile application that presents an information presentation identifying associated mobile applications, and may be launched upon completion of the single sign-on processing described through reference to FIGS. 8A-8C.

At block 904, the second mobile application may determine that it was launched from within the first mobile application based on a parameter passed from the first mobile application and may further determine that an active interaction session exists with the second back-end server 110/112 (or in those embodiments in which the second mobile application is associated with multiple back-end servers, that a respective active interaction session exists for each such back-end server). Based on these determinations, the second mobile application may determine that user credentials are not required for authenticating the user.

As the second mobile application has not transmitted an explicit sign-in request to the application linking server 108, it may not have received the application association information from the application linking server 108. Accordingly, at block 906, the second mobile application may generate a request for application association information and transmit the request at block 908. In certain other embodiments, the second mobile application may be able to access the application association information that was received by another associated mobile application from the encrypted portion of the data storage 206, in which case, processing would then continue from block 914.

At block 910, the application linking server may generate a response that includes the application association information. As previously noted, the application association information may include a respective identifier associated with each associated mobile application, respective back-end server identification information identifying a respective set of one or more back-end servers associated with each associated mobile application, respective metadata associated with each associated mobile application, and so forth. At block 912, the application linking server 108 may transmit the response to the second mobile application.

At block 914, which may be performed immediately after processing the received response or when a user navigates to the user interface for presenting an information presentation, the second mobile application may generate the information presentation identifying associated mobile applications based at least in part on the application association information received from the application linking server 108. As previously described, the information presentation may include various indicators that indicate a respective status of each associated mobile application. For example, the information presentation may include a first indicator that identifies those associated mobile applications identified in the information presentation that are downloaded and fully integrated for leveraging single sign-on processing, a second indicator that identifies those associated mobile applications identified in the information presentation that are not yet downloaded to the user device 104 but which are available for download, and in certain operating system environments and/or implementations, a third indicator that identifies those associated mobile applications that are downloaded but not yet fully integrated for leveraging single sign-on processing. In various embodiments, information stored locally (e.g., in memory 204 or the encrypted portion of the data storage 206 of the user device 104) may be accessed to determine which indicator each mobile application in the information presentation is associated with. In certain embodiments, the indicators may include a flag, identifier, tag, or the like.

At block 916, the second mobile application may present a user interface associated with the second mobile application. The user interface may display various content associated with the second mobile application and may be a landing page, menu page, tab-bar interface, or the like. In certain embodiments, the first user interface presented by the second mobile application may be a user interface for presenting the information presentation. It should be appreciated that any suitable user interface associated with the second mobile application may be presented via the user device 104 to the user upon successful launch of the second mobile application. Further, as previously noted, although generation of the information presentation is depicted in FIG. 9 as occurring upon receipt of the response from the application linking server 108 and prior to presentation of the initial user interface associated with the second mobile application, it should be appreciated that, in various embodiments, the information presentation may be dynamically generated upon navigation of the user to the user interface presenting the information presentation from the initial user interface presented to the user or from one or more other associated mobile applications.

At this stage in the processing flow 900, both the first mobile application and the second mobile application are executing on the user device 104 and an ALS session identifier, a first back-end server session identifier indicative of an interaction session with the first back-end server 110/112, and a second back-end server session identifier indicative of an interaction session with the second back-end server 110/112 are stored in the encrypted portion of the data storage 206 of the user device 104. The user of the user device 104 is able to navigate between the first and second mobile applications and within user interfaces of a same mobile application (e.g., from a first user interface to a user interface for presenting the information presentation) and perform operations that require appropriate back-end server support. A user is further able to switch between associated mobile applications executing on the user device 104 via respective user interfaces of the associated mobile applications that present the information presentation. For example, a user may be able to bring to the foreground an active instance of the second mobile application executing on the user device 104 via selection of the second mobile application from a user interface presenting the information presentation and which is associated with a first mobile application without launching a new instance of the second mobile application. The user may then be able to navigate, from within the second mobile application, to the user interface presenting the information presentation, select the first mobile application from the user interface, and bring the active instance of the first mobile application to the foreground without launching a new instance of the first mobile application.

The operations described and depicted with respect to the illustrative processing flows of FIGS. 3A-9 may be carried out or performed in any suitable order as desired in various embodiments of the disclosure. Additionally, in certain embodiments, at least a portion of the operations may be carried out in parallel. Furthermore, in certain embodiments, less, more, or different operations than those depicted in FIGS. 3A-9 may be performed.

Illustrative User Interfaces

Figure 10:
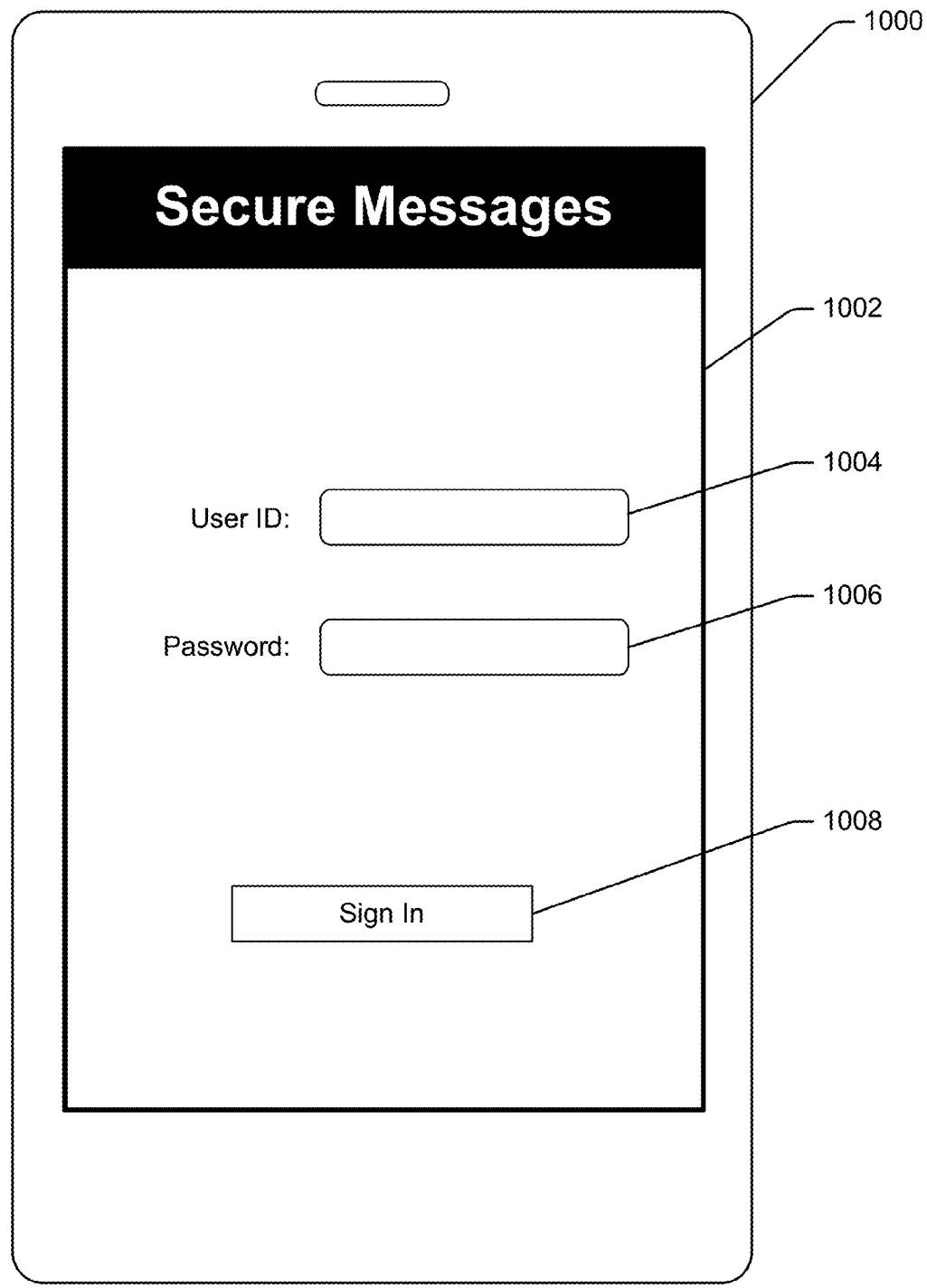
FIG. 10 depicts an illustrative mobile application user interface for receiving authentication credentials associated with a user in accordance with one or more embodiments of the disclosure.

FIG. 10 depicts an illustrative mobile application user interface for receiving authentication credentials associated with a user in accordance with one or more embodiments of the disclosure.

An illustrative user device 1000 is depicted in FIG. 10. The user device 1000 may correspond to the illustrative user device 104 depicted in FIG. 2 for example. The user device 1000 includes a display 1002 depicted as presenting a user interface associated with a first mobile application. The first mobile application may be any application in the set of associated mobile applications (e.g., 214(1)-214(S)). The user interface depicted in FIG. 10 may be presented upon launching of the first mobile application from a "home screen" of the user device 1000. In other embodiments, the user interface depicted in FIG. 10 may be presented upon failure to identify the user or failure to confirm an active interaction session through single sign-on processing performed in connection with the first mobile application.

The illustrative user interface depicted in FIG. 10 may include various fields 1004, 1006 for receiving authentication credentials associated with a user of the user device 1000. The authentication credentials may include any suitable identifiers for authenticating the user such as, for example, a combination of a user id and a password or PIN, a combination of an electronic mail address and a password or PIN number, a combination of a user id or electronic mail address and a one-time use code, and so forth. The user interface may further include a selectable widget 1008 for submitting the authentication credentials to the first mobile application.

Figure 11:
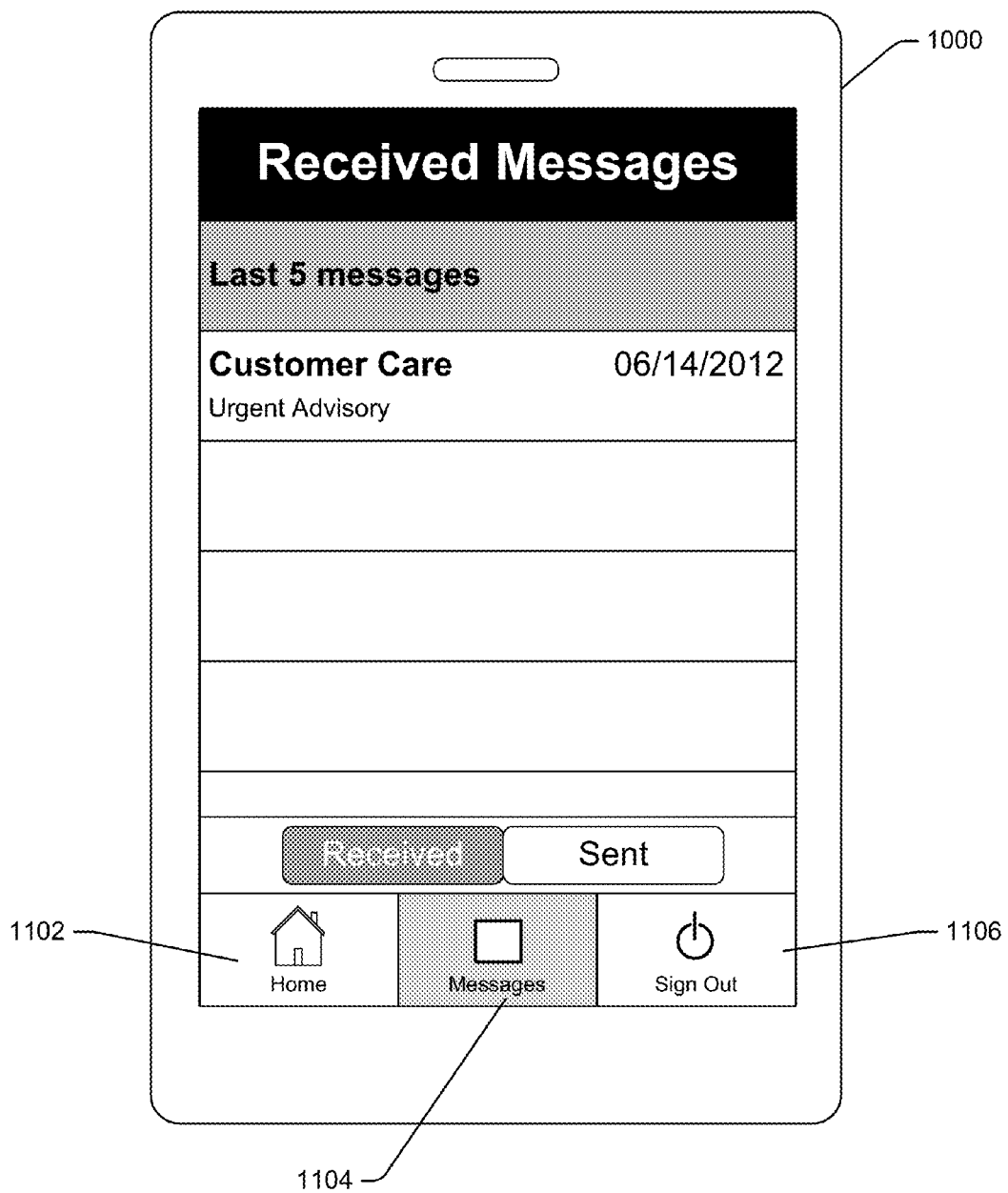
FIG. 11 depicts another illustrative mobile application user interface for displaying content associated with the mobile application in accordance with one or more embodiments of the disclosure.

FIG. 11 depicts another illustrative mobile application user interface for displaying content associated with the mobile application in accordance with one or more embodiments of the disclosure.

The user interface depicted in FIG. 11 may be an initial user interface of the first mobile application that is presented to the user via the display 1002 of the user device 1000 upon successful authentication of the user based on the received authentication credentials. A menu or navigation bar may be provided that allows the user to navigate between various user interfaces of the first mobile application. For example, soft-key button 1102 or the like may be provided for navigating to a user interface for presenting the information presentation relating to mobile applications associated with the first mobile application. A button 1104 in the navigation bar may be associated with a user interface of the first mobile application for displaying message content associated with the first mobile application. The user interface depicted in FIG. 11 may be presented upon user selection of the button 1104 as shown. Various other buttons may be provided as well (e.g., a sign-out button 1106).

Figure 12:
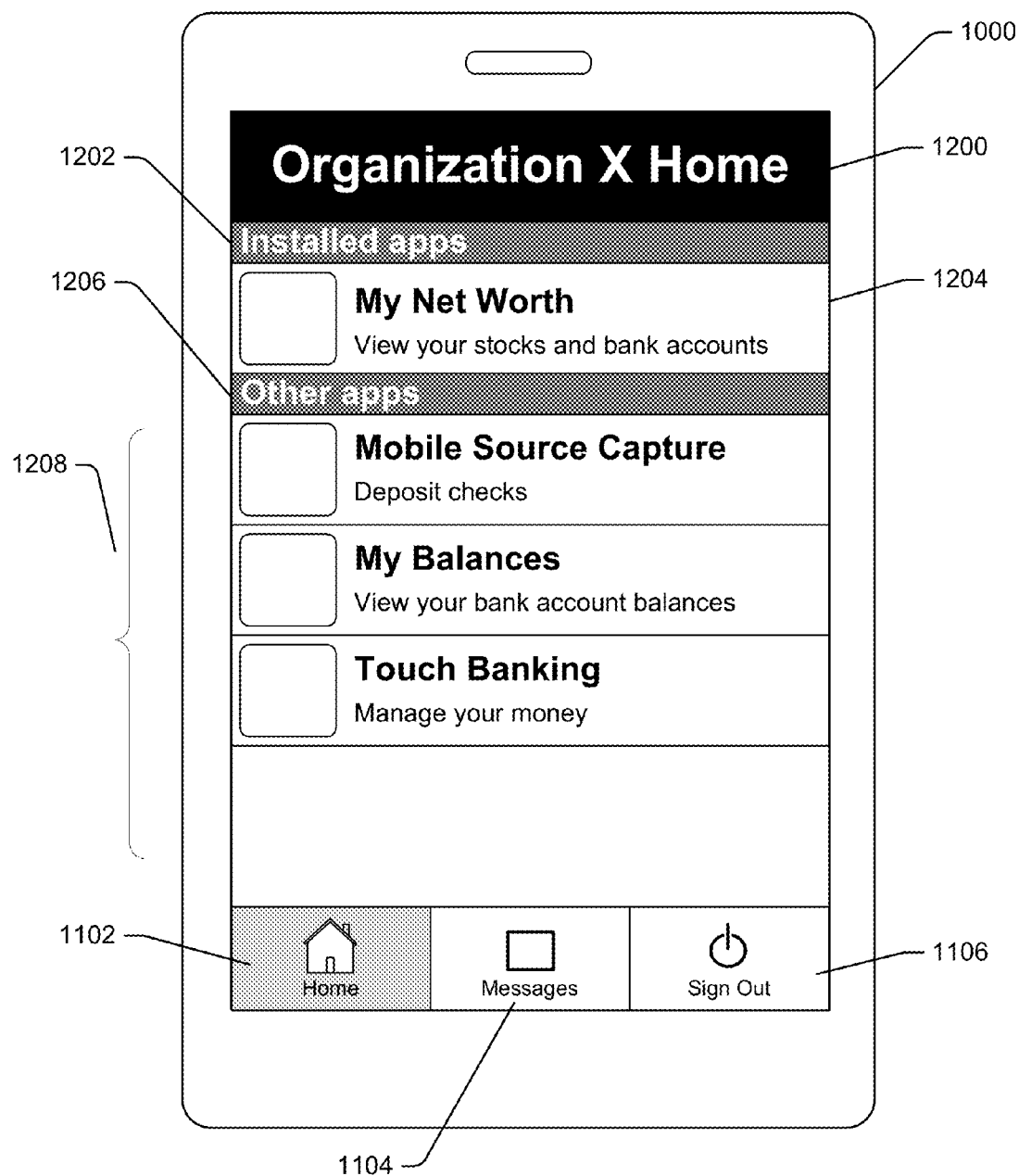
FIG. 12 depicts an illustrative mobile application user interface for displaying an information presentation relating to associated mobile applications in accordance with one or more embodiments of the disclosure.

FIG. 12 depicts an illustrative mobile application user interface for displaying an information presentation relating to associated mobile applications in accordance with one or more embodiments of the disclosure.

The user interface depicted in FIG. 12 may be presented upon user selection of the button 1102. The user interface depicted in FIG. 12 may be a user interface of the first mobile application for presenting an information presentation identifying various other mobile applications associated with the first mobile application. A first indicator 1202 may be provided to identify those associated mobile applications that are downloaded on the user device 1000 and fully integrated. In the example shown in FIG. 12, the "My Net Worth" mobile application is currently downloaded on the user device 1000. The information presentation may further include a second indicator 1206 that identifies those associated mobile applications 1208 that are available for download but which have not been downloaded to the user device 1000.

Figure 13:
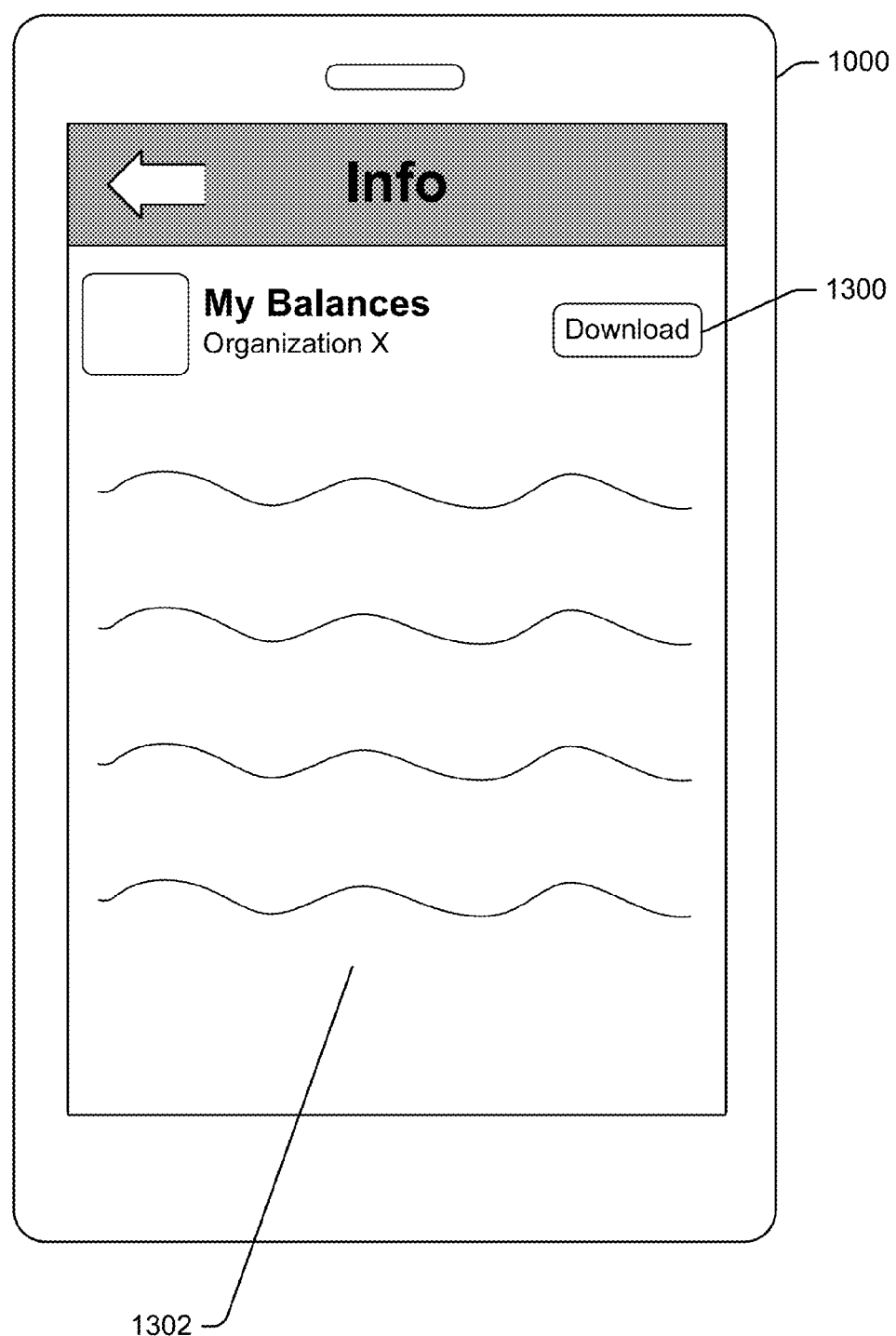
FIG. 13 depicts an illustrative mobile application user interface for initiating a download of a mobile application in accordance with one or more embodiments of the disclosure.

FIG. 13 depicts an illustrative mobile application user interface for initiating a download of a mobile application in accordance with one or more embodiments of the disclosure.

The user interface depicted in FIG. 13 may be presented via the display 1002 of the user device 1000 responsive to user selection of one of the associated mobile applications 1208 (e.g., the My Balances application) from the information presentation presented via the user interface depicted in FIG. 12. The user interface depicted in FIG. 13 may be a download panel generated by an application source server (e.g., the application source server 114) storing the selected mobile application and may be transmitted to the user device 1000 for presentation to the user. The download panel may include a description 1302 of the functionality supported by the selected mobile application as well as a selectable widget 1300 for initiating a download of the selected mobile application.

Figure 14:
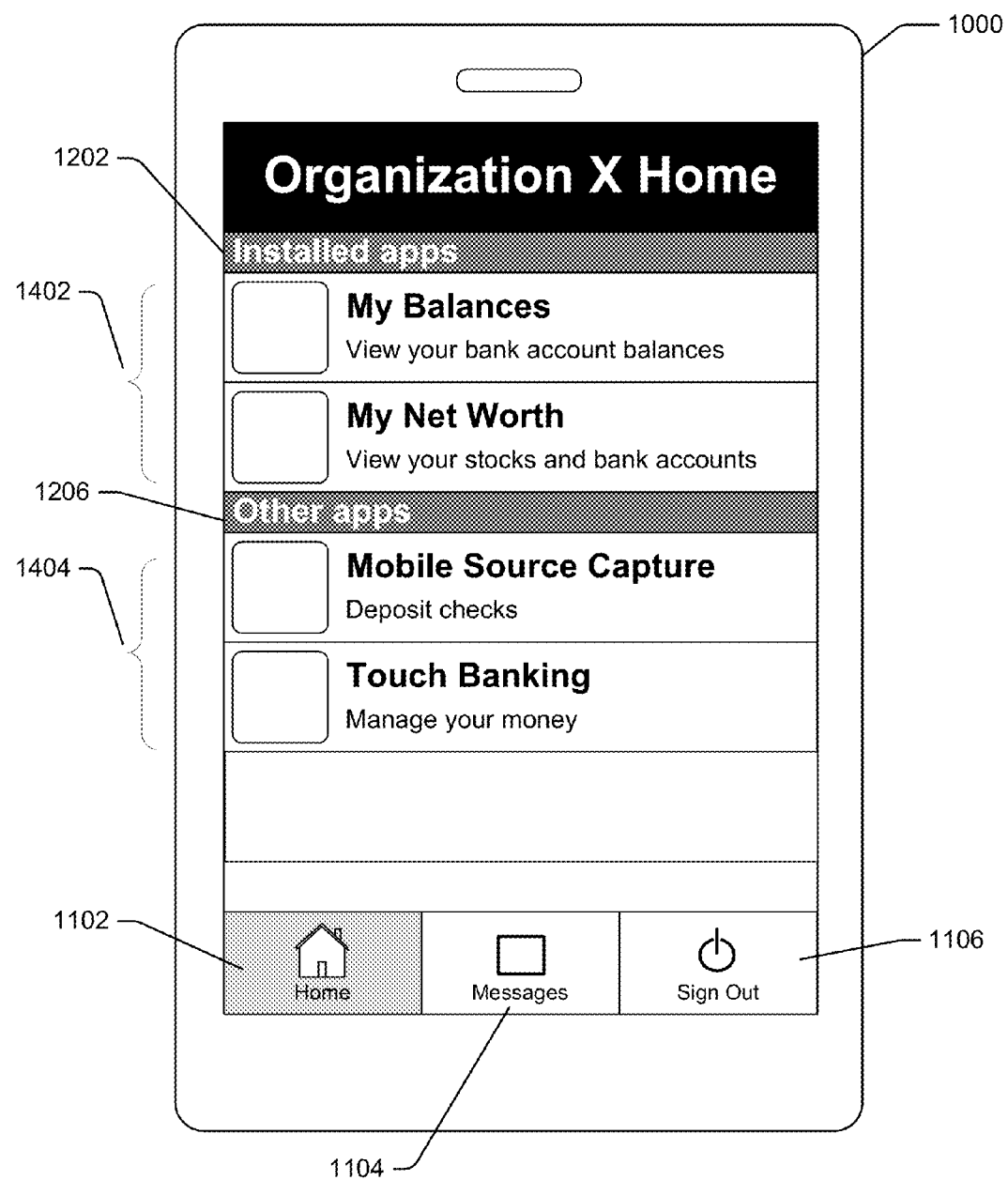
FIG. 14 depicts another illustrative mobile application user interface for displaying a regenerated information presentation in accordance with one or more embodiments of the disclosure.

FIG. 14 depicts another illustrative mobile application user interface for displaying a regenerated information presentation in accordance with one or more embodiments of the disclosure.

As noted previously through reference to FIG. 12, the user interface depicted in FIG. 14 may be presented upon user selection of the button 1102 and may be a user interface for presenting an information presentation relating to mobile applications associated with the first mobile application. The user interface depicted in FIG. 14 may present a regenerated information presentation that identifies a current status associated with each mobile application associated with the first mobile application. For example, upon download and integration of the "My Balances" application, the information presentation shown in FIG. 12 may be regenerated and presented as shown in FIG. 14. In certain embodiments, the information presentation may be regenerated responsive to user navigation to the user interface for presenting the information presentation. In the regenerated information presentation, various mobile applications 1402 are identified as being downloaded and fully integrated and various mobile applications 1404 continue to be identified as available for download.

Figure 15:
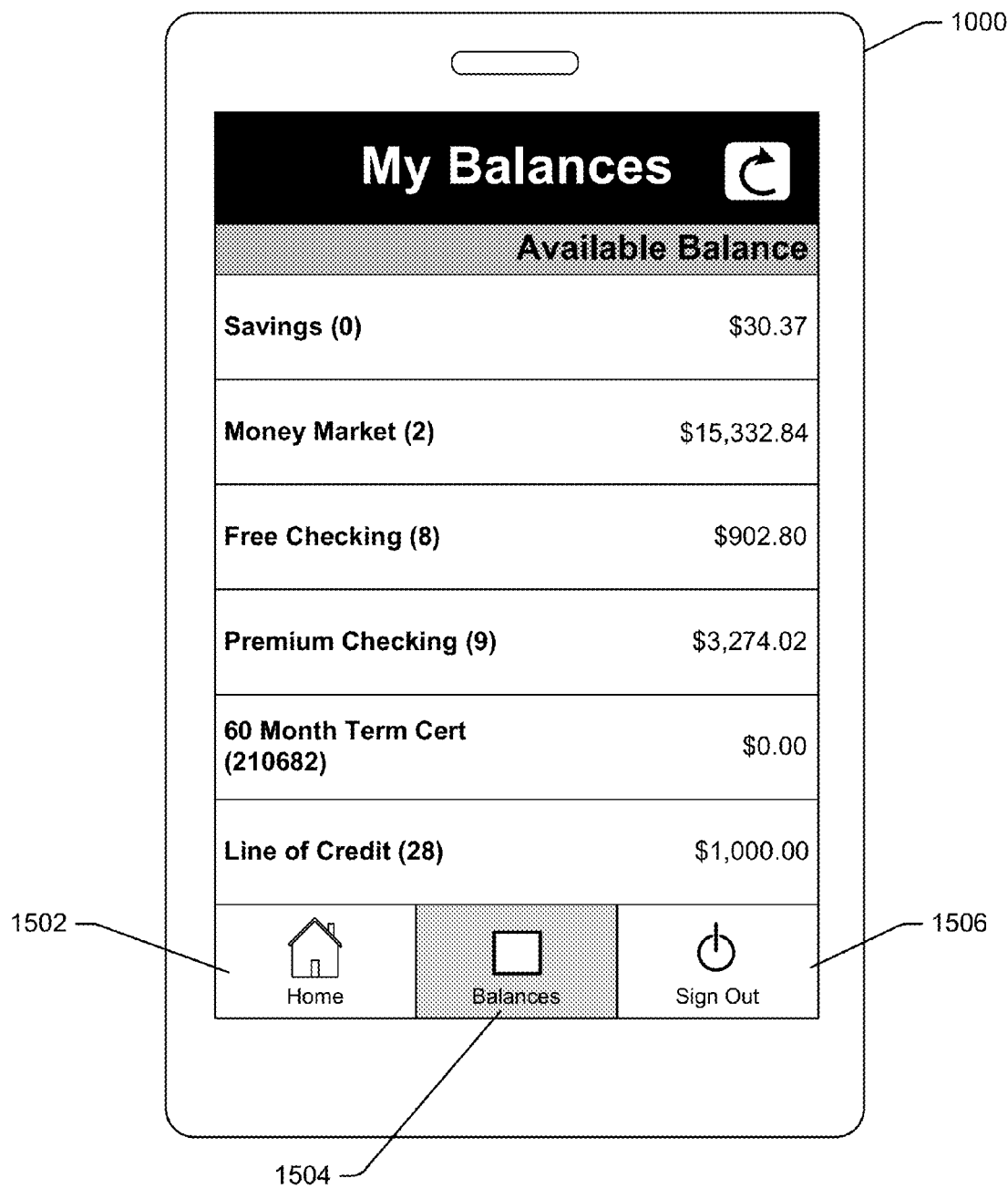
FIG. 15 depicts another illustrative mobile application user interface for displaying content associated with a mobile application in accordance with one or more embodiments of the disclosure.

FIG. 15 depicts another illustrative mobile application user interface for displaying content associated with a mobile application in accordance with one or more embodiments of the disclosure.

The user interface depicted in FIG. 15 may be presented via the display 1002 of the user device 1000 upon user selection of a second mobile application of the associated mobile applications (e.g., the "My Balances" app) from, for example, the information presentation depicted in FIG. 14. In one or more embodiments of the disclosure, upon user selection of the second mobile application, single sign-on processing as described earlier may be performed to establish a respective authentication session with each back-end server with which the second mobile application is associated such that the second mobile application may be launched without requiring authentication credentials. Similar to the first mobile application, the second mobile application may include various soft-key buttons or the like for navigating between different user interfaces of the second mobile application. For example, a button 1502 may be provided for navigating to a user interface of the second mobile application for presenting an information presentation relating to mobile applications associated with the second mobile application. Further, a button 1504 may be provided for navigating to a user interface for displaying balance content associated with the second mobile application (as shown in FIG. 15) as well as various other buttons such as a sign-out button 1506.

Figure 16:
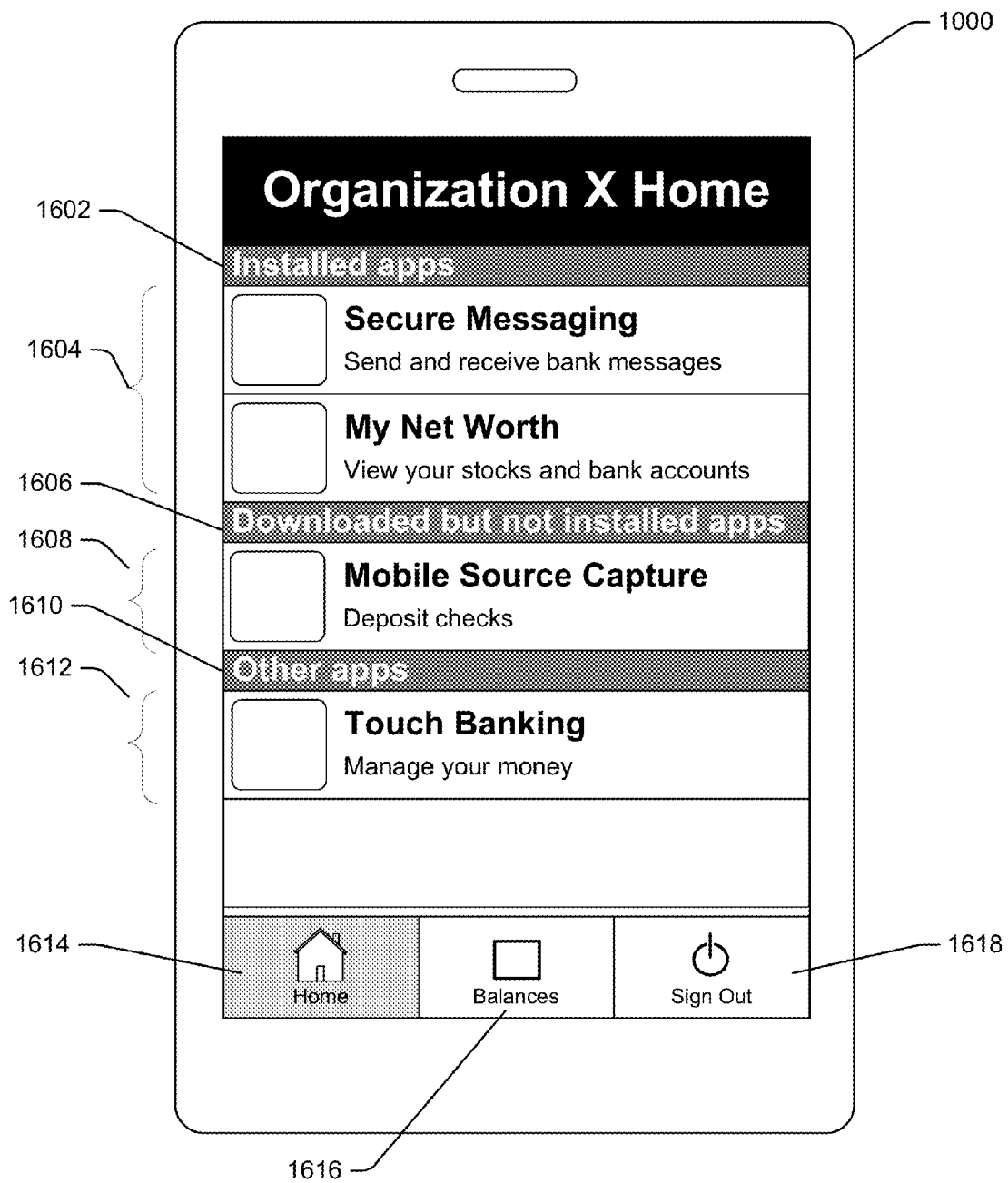
FIG. 16 depicts another illustrative mobile application user interface for displaying an information presentation relating to associated mobile applications in accordance with one or more embodiments of the disclosure.

FIG. 16 depicts another illustrative mobile application user interface for displaying another illustrative information presentation relating to associated mobile applications in accordance with one or more embodiments of the disclosure.

As previously noted, in certain operating system environments and implementations, various associated mobile applications may have an intermediate status in which the applications are downloaded to the user device but not yet fully integrated for leveraging single sign-on processing. FIG. 16 depicts an illustrative user interface presenting an information presentation in such an operating system environment. The user interface depicted in FIG. 16 may be associated with, for example, the "My Balances" application. The information presentation may include a first indicator 1602 that identifies those associated mobile applications 1604 that are installed and fully integrated and a second indicator 1610 that identifies those mobile applications 1612 that are available for download. The information presentation may further include a third indicator 1606 that identifies those mobile applications 1608 that are downloaded but not yet fully integrated for leveraging single sign-on processing. A navigation bar may also be provided that includes various buttons 1614, 1616 for navigating between various user interfaces and one or more other buttons (e.g., button 1618) for initiating other functions. Upon user selection of a mobile application associated with the indicator 1606 (e.g., Mobile Source Capture), processing as described in FIGS. 6A-6B may be performed for fully integrating the mobile application.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, although specific example embodiments have been presented, it should be appreciated that numerous other examples are within the scope of this disclosure.

Additional types of CRSM beyond those described previously that may be present in association with any of the components described herein (e.g., any of the components of the networked architecture 100) may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, solid-state memory devices, or any other medium. Combinations of any of the above are also included within the scope of CRSM.

Computer-readable communication media may include computer-readable instructions, program modules, or other data transmitted within a data signal, such as a carrier wave, or other transmission. Examples of computer-readable communication media, whether modulated using a carrier or not, include, but are not limited to, signals that a computer system or machine hosting or running a computer program can be configured to access, including signals downloaded through the Internet or other networks. For example, the distribution of software may be an Internet download. It is noted that, as used herein, CRSM does not include computer-readable communication media.

Although embodiments have been described in language specific to structural features and/or methodological acts, it is to be understood that the disclosure is not necessarily limited to the specific features or acts described. Rather, the specific features and acts are disclosed as illustrative forms of embodiments of the disclosure. Conditional language such as, for example, "can," "could," "might," or "may," unless specifically stated otherwise, or unless otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. One or more non-transitory computer-readable media storing a first mobile application and a second mobile application, together comprising computer-executable instructions that, responsive to execution by at least one processor, configure the at least one processor to perform operations comprising:
    presenting, by a mobile computing device to a user of the mobile computing device, a first user interface associated with the first mobile application comprising a first information presentation identifying one or more mobile applications associated with the first mobile application, wherein (a) the first mobile application is associated with a first server application, (b) the one or more mobile applications comprise the second mobile application, (c) the first information presentation indicates the second mobile application has been downloaded but not integrated to enable single sign-on processing, and (d) the second mobile application is associated with a second server application;
    responsive to presenting the first user interface, receiving, by the mobile computing device, a request on behalf of the user to launch the second mobile application;
    responsive to receiving the request on behalf of the user to launch the second mobile application, determining, by the mobile computing device, that the second mobile application is not integrated to enable single sign-on processing;
    responsive to determining that the second mobile application is not integrated to enable single sign-on processing, launching, by the mobile computing device, the second mobile application without a parameter indicating that the second mobile application was launched from the first mobile application;
    obtaining, by the mobile computing device, authentication credentials associated with the user for the second server application;
    generating, by the mobile computing device, a request to establish a session with the second server application on behalf of the user, wherein the request to establish a session with the second server application on behalf of the user comprises the authentication credentials;
    transmitting, by the mobile computing device, the request to establish a session with the second server application on behalf of the user to an application linking server;
    receiving, by the mobile computing device and from the application linking server, a response to the request to establish a session with the second server application on behalf of the user, wherein the response comprises (a) a second server application session token indicating an established session with the second server application on behalf of the user, (b) an application linking server session token, and (c) application association information related to a set of associated mobile applications; and
    presenting, by the mobile computing device to the user of the mobile computing device based at least in part on information extracted from the response, a second user interface associated with the first mobile application and comprising a second information presentation identifying the one or mobile applications associated with the first mobile application, wherein the second information presentation indicates the second mobile application has been downloaded and integrated to enable single sign-on processing.

2. The one or more computer-readable media of claim 1, wherein presenting the first information presentation comprises generating the first information presentation based at least in part on data stored on the mobile computing device.

3. The one or more computer-readable media of claim 2, wherein the operations further comprise:
    determining, by the mobile computing device, based at least in part on the data stored on the mobile computing device, an integration status of the second mobile application, wherein (a) the integration status of the second mobile application status indicates that the second mobile application has been downloaded but not integrated to enable single sign-on processing, and (b) the first information presentation comprises the integration status of the second mobile application; and
    determining, by the mobile computing device, based at least in part on the data stored on the mobile computing device, an integration status of a third mobile application of the one or more mobile applications associated with the first mobile application, wherein (a) the integration status of a third mobile application indicates that the third mobile application has been downloaded and integrated to enable single sign-on processing, and (b) the first information presentation comprises the integration status of a third mobile application.

4. The one or more computer-readable media of claim 1, wherein launching the second mobile application without a parameter enables the second application to receive the authentication credentials associated with the user for the second server application.

5. The one or more computer-readable media of claim 1, wherein the operations further comprise:
    determining, by the mobile computing device, that the second mobile application has been integrated to enable single sign-on processing; and
    generating, by the mobile computing device, the second information presentation based at least in part on the determining that the second mobile application has been integrated.

6. The one or more computer-readable media of claim 1, wherein the one or more mobile applications are associated with the first mobile application based at least in part on one or more association criteria, the one or more association criteria comprising a same issuing entity being associated with the first mobile application and each of the one or more mobile applications.

7. The one or more computer-readable media of claim 1, wherein the authentication credentials authenticate the user with the second server application.

8. The one or more computer-readable media of claim 1, wherein the operations further comprise receiving, by the mobile computing device, the application association information associated with the one or more mobile applications, the application association information comprising a respective identifier associated with each of the one or more mobile applications.

9. The one or more computer-readable media of claim 8, wherein the operations further comprise processing, by the mobile computing device, the application association information to generate the first information presentation.

10. The one or more computer-readable media of claim 1, wherein (a) the first server application is executing on a first back-end system and the second server application is executing on a second back-end system and (b) the request to establish a session with the second server application on behalf of the user comprises (i) an identifier of the first back-end system, (ii) a first server application session token indicating an established session with the first server application on behalf of the user, and (iii) an identifier of the second back-end system.

11. The one or more computer-readable media of claim 1, wherein the first server application session token is stored in an encrypted portion of the data storage of the mobile computing device, the encrypted portion being accessible by the first mobile application and the second mobile application.

12. The one or more computer-readable media of claim 1, wherein the operations further comprise providing, by the mobile computing device to the second mobile application, a parameter indicating that the second mobile application was launched by the user second interface associated with the first mobile application.

13. The one or more computer-readable media of claim 1, wherein the operations further comprise overwriting the application linker server session token stored in the data storage of the mobile computing device with an updated application linker server session token.

14. The one or more computer-readable media of claim 13, wherein at least one of the application linking server session token or the updated application linking server session token is associated with a time-to-live (TTL) value.

15. The one or more computer-readable media of claim 1, wherein (a) the application linker server session token is associated with a time-to-live (TTL) value for the interaction session with the application linking system, and (b) the updated application linker server session token is associated with an updated TTL value.

16. An apparatus comprising at least one processor and at least one memory including program code, the at least one memory and the program code configured to, with the processor, cause the apparatus to at least:
present, to a user of the apparatus, a first user interface associated with the first mobile application comprising a first information presentation identifying one or more mobile applications associated with the first mobile application, wherein (a) the first mobile application is associated with a first server application, (b) the one or more mobile applications comprise the second mobile application, (c) the first information presentation indicates the second mobile application has been downloaded but not integrated to enable single sign-on processing, and (d) the second mobile application is associated with a second server application;
responsive to presenting the first user interface, receive a request on behalf of the user to launch the second mobile application;
responsive to receiving the request on behalf of the user to launch the second mobile application, determine that the second mobile application is not integrated to enable single sign-on processing;
responsive to determining that the second mobile application is not integrated to enable single sign-on processing, launch the second mobile application without a parameter indicating that the second mobile application was launched from the first mobile application;
obtain authentication credentials associated with the user for the second server application;
generate a request to establish a session with the second server application on behalf of the user, wherein the request to establish a session with the second server application on behalf of the user comprises the authentication credentials;
transmit the request to establish a session with the second server application on behalf of the user to an application linking server;
receive, from the application linking server, a response to the request to establish a session with the second server application on behalf of the user, wherein the response comprises (a) a second server application session token indicating an established session with the second server application on behalf of the user, (b) an application linking server session token, and (c) application association information related to a set of associated mobile applications; and
present, to the user of the apparatus based at least in part on information extracted from the response, a second user interface associated with the first mobile application and comprising a second information presentation identifying the one or mobile applications associated with the first mobile application, wherein the second information presentation indicates the second mobile application has been downloaded and integrated to enable single sign-on processing.

17. The apparatus of claim 16, wherein presenting the first information presentation comprises generating the first information presentation based at least in part on data stored on the apparatus.

18. The apparatus of claim 17, wherein the memory and program code are further configured to, with the processor, cause the apparatus to:
determine, based at least in part on the data stored on the apparatus, an integration status of the second mobile application, wherein (a) the integration status of the second mobile application status indicates that the second mobile application has been downloaded but not integrated to enable single sign-on processing, and (b) the first information presentation comprises the integration status of the second mobile application; and
determining, based at least in part on the data stored on the apparatus, an integration status of a third mobile application of the one or more mobile applications associated with the first mobile application, wherein (a) the integration status of a third mobile application indicates that the third mobile application has been downloaded and integrated to enable single sign-on processing, and (b) the first information presentation comprises the integration status of a third mobile application.

19. The apparatus of claim 16, wherein launching the second mobile application without a parameter enables the second application to receive the authentication credentials associated with the user for the second server application.

20. The apparatus of claim 16, wherein the memory and program code are further configured to, with the processor, cause the apparatus to:
determine that the second mobile application has been integrated to enable single sign-on processing; and generate the second information presentation based at least in part on the determining that the second mobile application has been integrated.

21. The apparatus of claim 16, wherein the one or more mobile applications are associated with the first mobile application based at least in part on one or more association criteria, the one or more association criteria comprising a same issuing entity being associated with the first mobile application and each of the one or more mobile applications.

22. The apparatus of claim 16, wherein the authentication credentials authenticate the user with the second server application.

23. The apparatus of claim 16, wherein the memory and program code are further configured to, with the processor, cause the apparatus to receive the application association information associated with the one or more mobile applications, the application association information comprising a respective identifier associated with each of the one or more mobile applications.

24. The apparatus of claim 23, wherein the memory and program code are further configured to, with the processor, cause the apparatus to process the application association information to generate the first information presentation.

25. The apparatus of claim 16, wherein (a) the first server application is executing on a first back-end system and the second server application is executing on a second back-end system and (b) the request to establish a session with the second server application on behalf of the user comprises (i) an identifier of the first back-end system, (ii) a first server application session token indicating an established session with the first server application on behalf of the user, and (iii) an identifier of the second back-end system.

26. The apparatus of claim 16, wherein the first server application session token is stored in an encrypted portion of the data storage of the apparatus, the encrypted portion being accessible by the first mobile application and the second mobile application.

27. The apparatus of claim 16, wherein the memory and program code are further configured to, with the processor, cause the apparatus to provide, to the second mobile application, a parameter indicating that the second mobile application was launched by the user second interface associated with the first mobile application.

28. The apparatus of claim 16, wherein the memory and program code are further configured to, with the processor, cause the apparatus to overwrite the application linker server session token stored in the data storage of the apparatus with an updated application linker server session token.

29. The apparatus of claim 18, wherein at least one of the application linking server session token or the updated application linking server session token is associated with a time-to-live (TTL) value.

30. The apparatus of claim 16, wherein (a) the application linker server session token is associated with a time-to-live (TTL) value for the interaction session with the application linking system, and (b) the updated application linker server session token is associated with an updated TTL value.

\* \* \* \* \*